United States Patent
Paik et al.

(10) Patent No.: US 12,139,653 B2
(45) Date of Patent: Nov. 12, 2024

(54) METAL HALIDE COLLOIDAL NANOPARTICLES AND METHOD FOR PRODUCING THE SAME

(71) Applicant: CHUNG ANG UNIVERSITY ACADEMIC COOPERATION FOUNDATION, Seoul (KR)

(72) Inventors: Tae Jong Paik, Seoul (KR); Min Ji Lee, Seoul (KR)

(73) Assignee: CHUNG ANG UNIVERSITY INDUSTRY ACADEMIC COOPERATION FOUNDATION, Seoul (KR)

(*) Notice: Subject to any disclaimer, the term of this patent is extended or adjusted under 35 U.S.C. 154(b) by 0 days.

(21) Appl. No.: 17/574,717

(22) Filed: Jan. 13, 2022

(65) Prior Publication Data
US 2022/0220378 A1    Jul. 14, 2022

(30) Foreign Application Priority Data

Jan. 13, 2021   (KR) .................. 10-2021-0004666
Jan. 12, 2022   (KR) .................. 10-2022-0004884

(51) Int. Cl.
| | | |
|---|---|---|
| C09K 11/77 | (2006.01) | |
| C01F 17/36 | (2020.01) | |
| C09K 11/02 | (2006.01) | |
| B82Y 20/00 | (2011.01) | |
| B82Y 40/00 | (2011.01) | |

(52) U.S. Cl.
CPC .......... C09K 11/7705 (2013.01); C01F 17/36 (2020.01); C09K 11/025 (2013.01); C09K 11/772 (2013.01); C09K 11/7733 (2013.01); C09K 11/7748 (2013.01); *B82Y 20/00* (2013.01); *B82Y 40/00* (2013.01); *C01P 2004/64* (2013.01)

(58) Field of Classification Search
CPC ............ C09K 11/7704; C09K 11/7705; C09K 11/025; C09K 11/772; C09K 11/7733; C09K 11/7748; C01F 17/36; B82Y 20/00; B82Y 40/00; B82Y 30/00; C01P 2004/64; C01P 2004/04; C01P 2004/51; C01P 2002/72; C01P 2006/60
See application file for complete search history.

(56) References Cited

U.S. PATENT DOCUMENTS

2009/0020775 A1    1/2009   Radkov et al.
2021/0309518 A1*  10/2021   Dong .................. C01B 9/08

FOREIGN PATENT DOCUMENTS

KR         2020078290 A  *  7/2020  ............... C07F 7/24

OTHER PUBLICATIONS

KR-2020078290-A machine translation, 26 pages. (Year: 2020).*
Jing et al., "Photoluminescence of Singlet/Triplet Self-Trapped Excitons in Sb3+ Based Metal Halides", Adv. Optical Mater, 9, 15 pages. (Year: 2021).*
J. Shamsi et al., "Metal Halide Perovskite Nanocrystals: Synthesis, Post-Synthesis Modifications, and Their Optical Properties", Chem. Rev. 2019, 119, 5, 3296-3348.
Omar F. Mohammed, "Outstanding Challenges of Zero-Dimensional Perovskite Materials", J. Phys. Chem. Lett. 2019, 10, 19, 5886-5888.
Ou Chen et al., "Excitation-Intensity-Dependent Color-Tunable Dual Emissions from Manganese-Doped CdS/ZnS Core/Shell Nanocrystals", Angew Chem Int Ed Engl. Dec. 27, 2010;49(52):10132-5.
Qi Sun et al., "Excitation-Dependent Emission Color Tuning from an Individual Mn-Doped Perovskite Microcrystal", J. Am. Chem. Soc. 2019, 141, 51, 20089-20096.
Yueshan Xu, et al., "Upconversion Lifetime Imaging of Highly-Crystalline Gd-Based Fluoride Nanocrystals Featuring Strong Luminescence Resulting form Multiple Luminescent Centers", Advanced Optical Materials, 2020, 8, 1901495 (1 to 9).

* cited by examiner

*Primary Examiner* — Matthew E. Hoban
*Assistant Examiner* — Lynne Edmondson
(74) *Attorney, Agent, or Firm* — Norris McLaughlin, P.A.

(57) ABSTRACT

The present invention relates to metal halide colloidal nanoparticles represented by a following Chemical Formula 1 and a method for producing the same:

$$A_3MX_6 \qquad \text{[Chemical Formula 1]}$$

wherein in the Chemical Formula 1, A is an alkali metal element, M is a rare-earth metal element, and X is a halogen element.

16 Claims, 24 Drawing Sheets

[FIG. 1A]
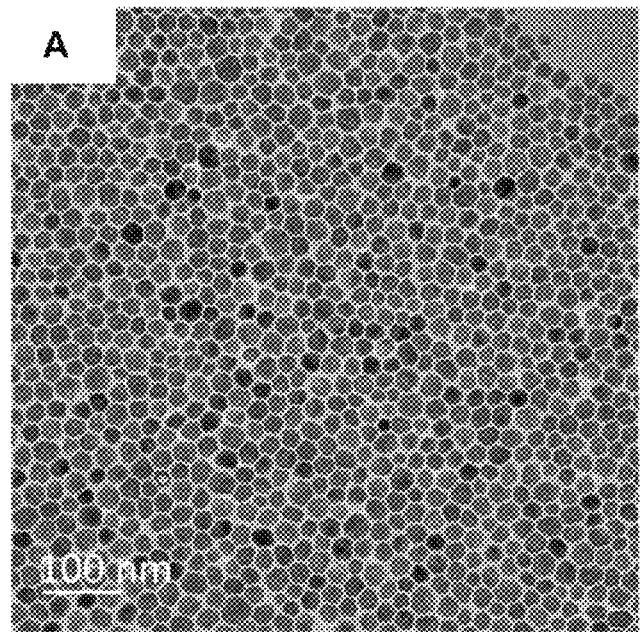
[FIG. 1B]
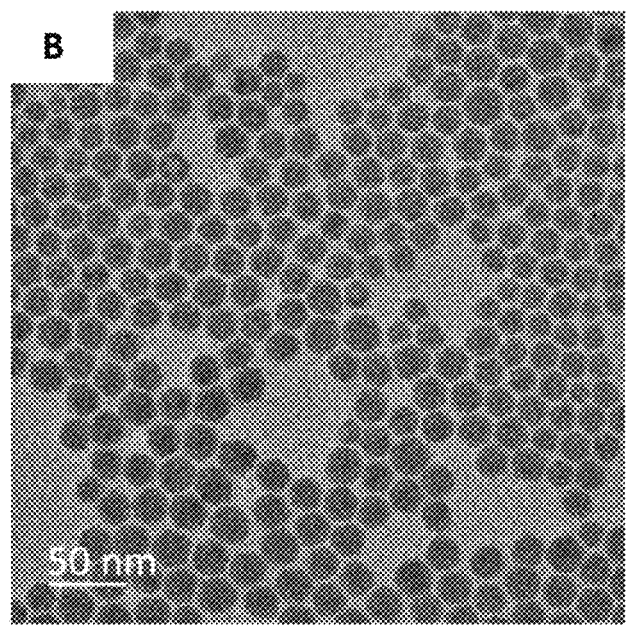

[FIG. 1C]
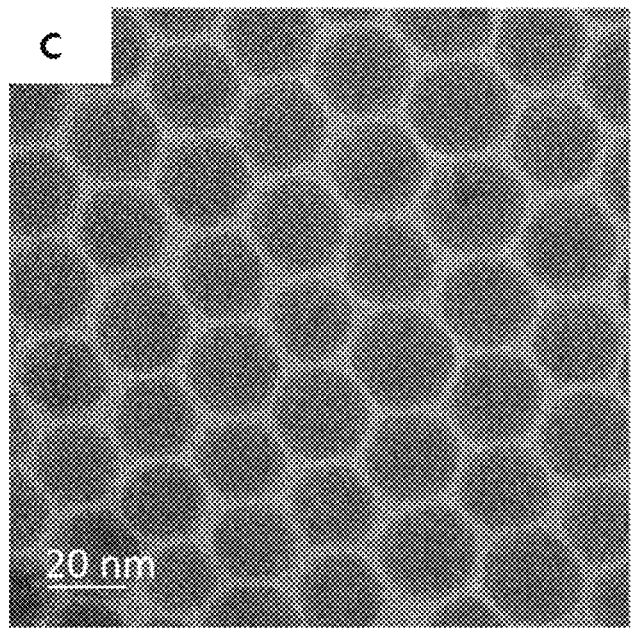
[FIG. 1D]
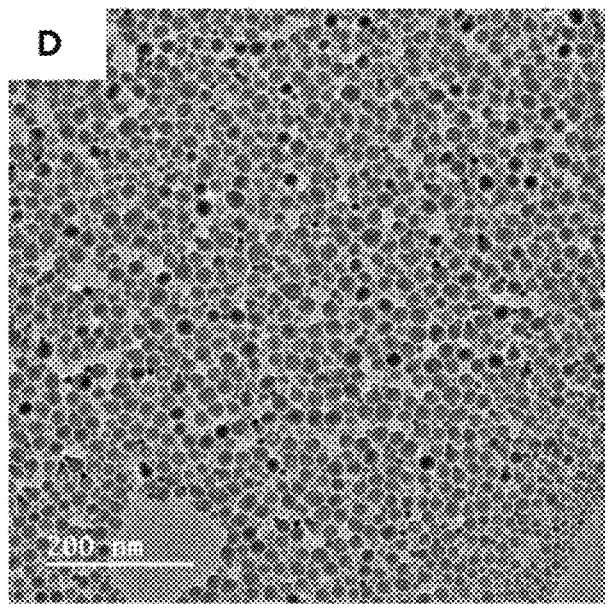

[FIG. 1E]
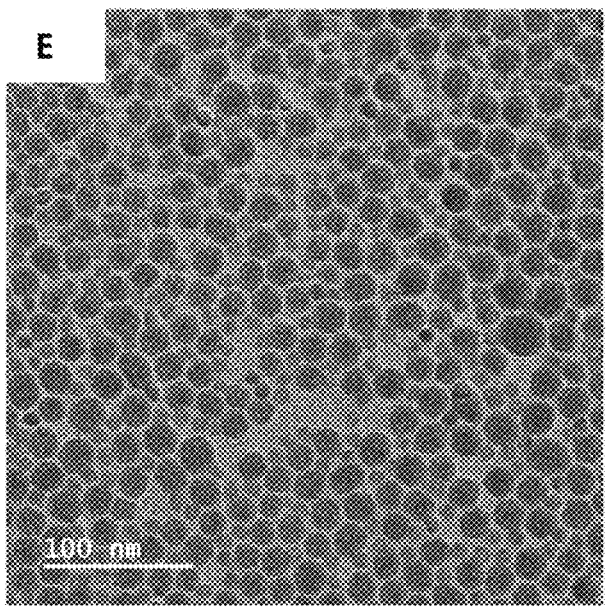
[FIG. 1F]
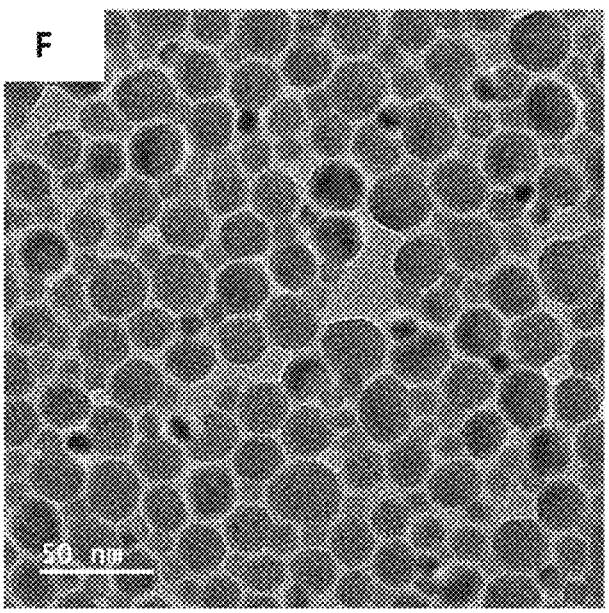

[FIG. 1G]
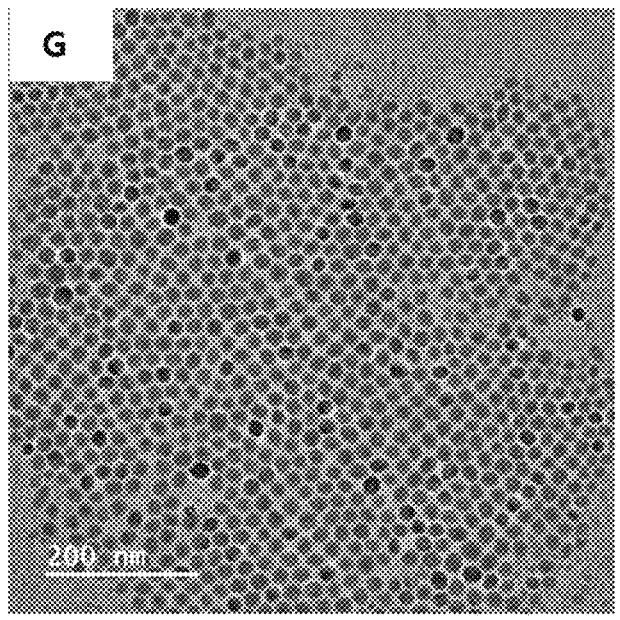
[FIG. 1H]
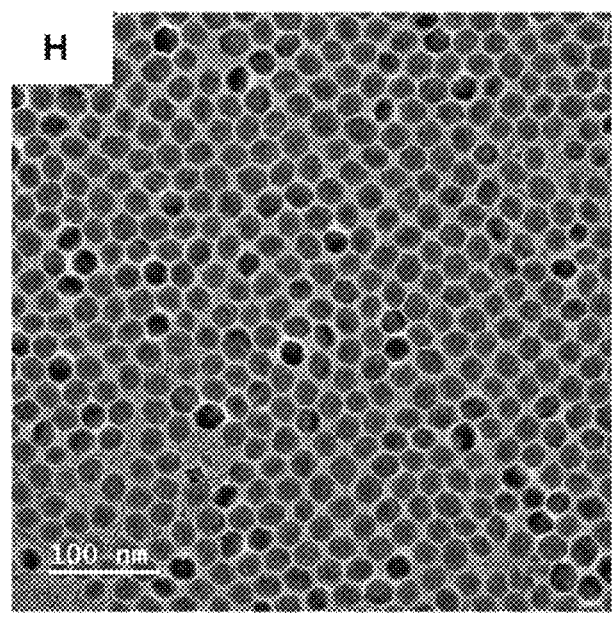

[FIG. 1I]
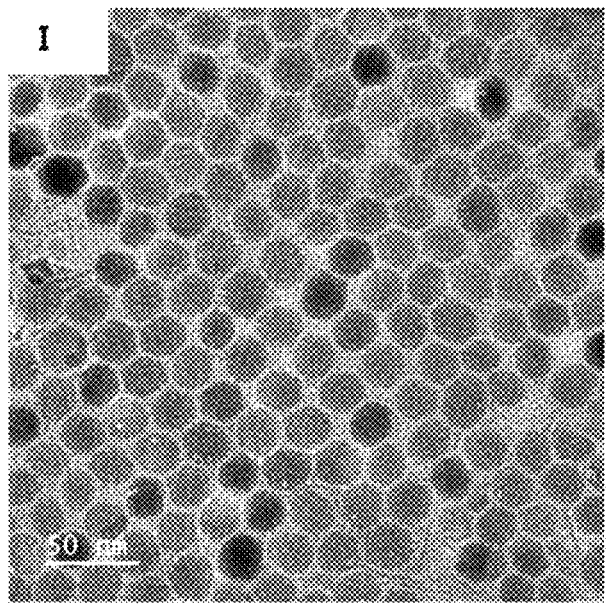
[FIG. 1J]
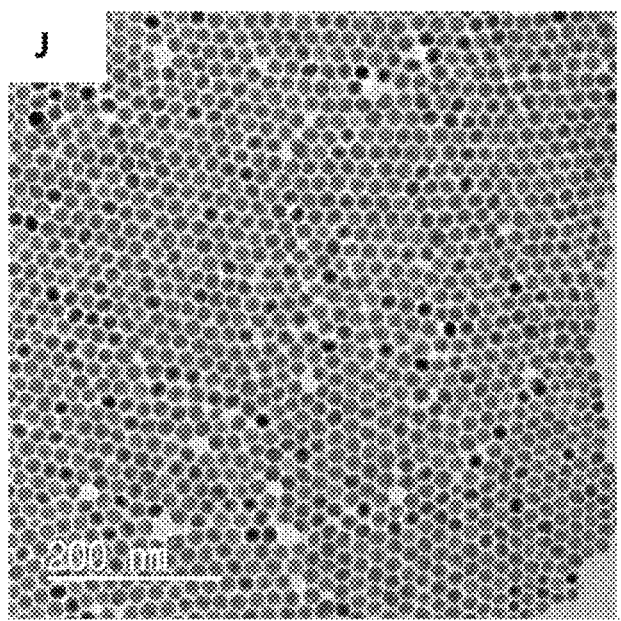

[FIG. 1K]
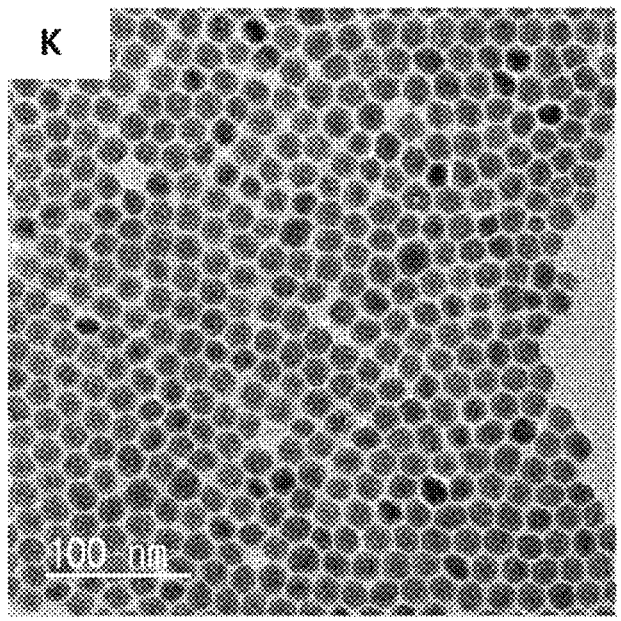
[FIG. 1L]
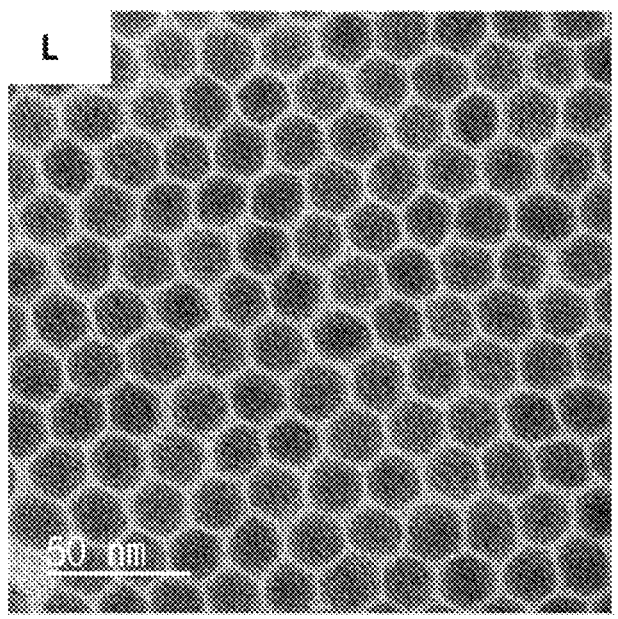

[FIG. 2A]
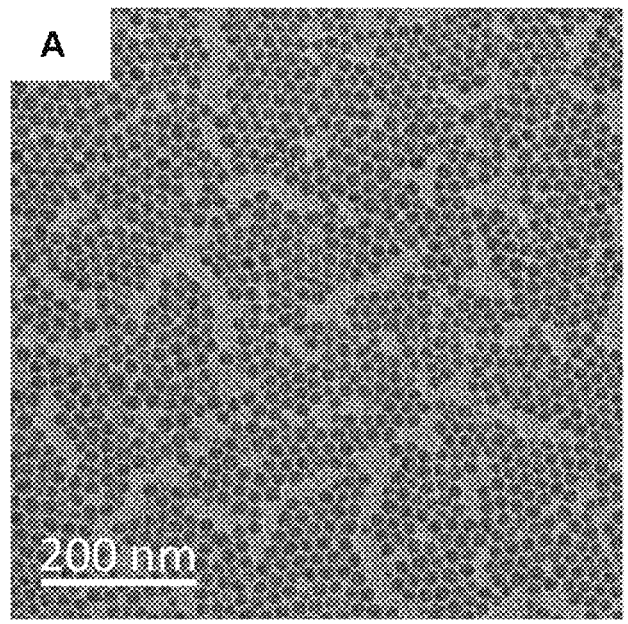
[FIG. 2B]
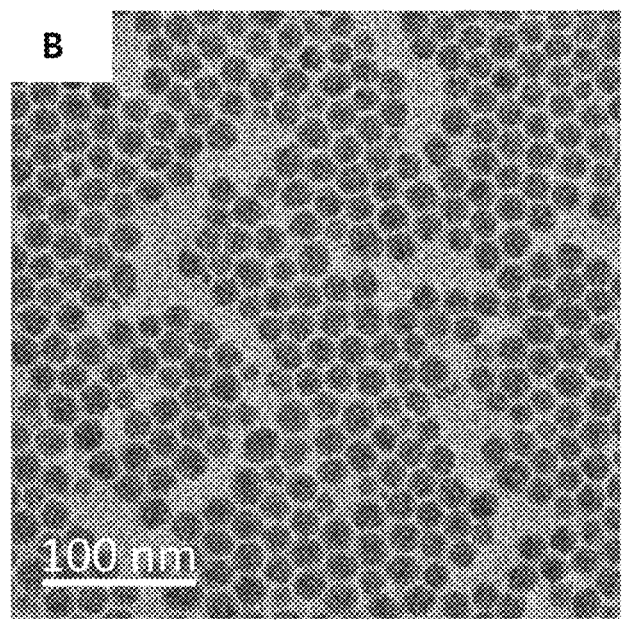

[FIG. 2C]
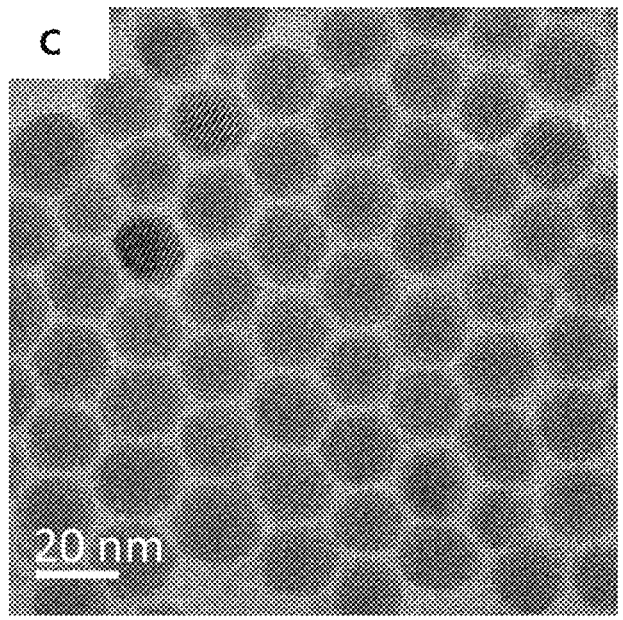
[FIG. 2D]
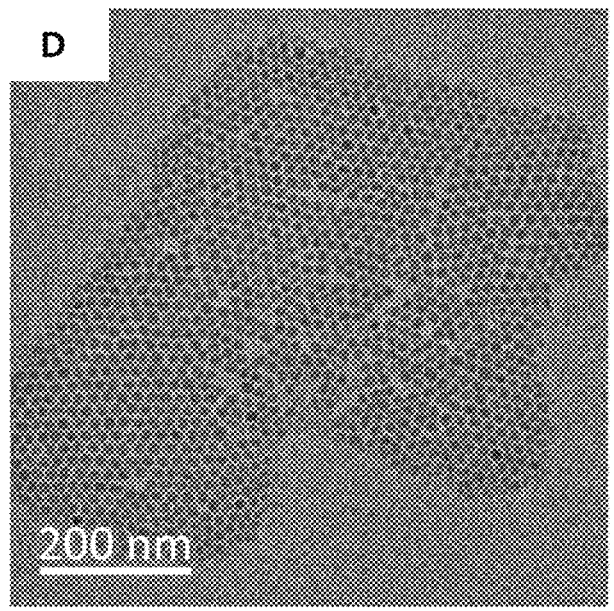

[FIG. 2E]
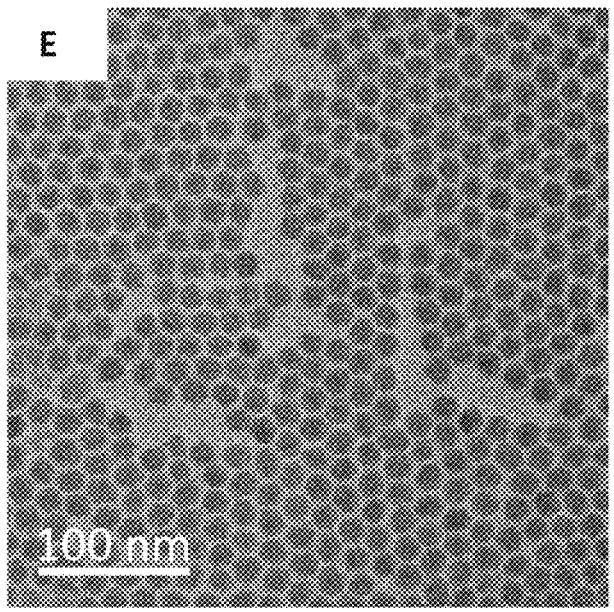
[FIG. 2F]
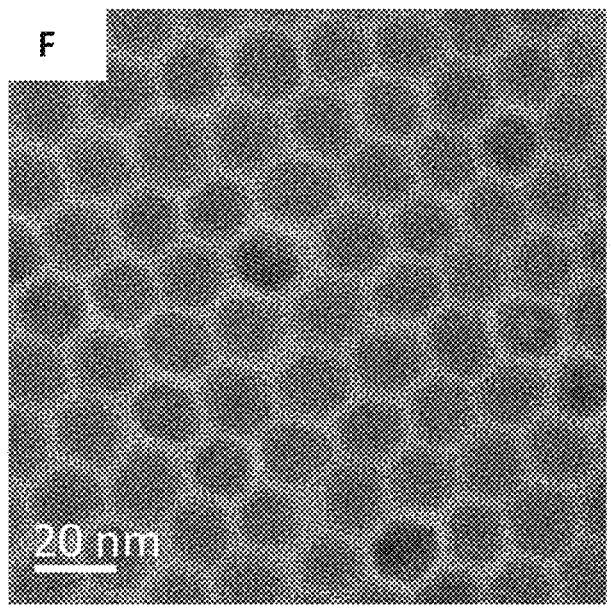

[FIG. 3A]
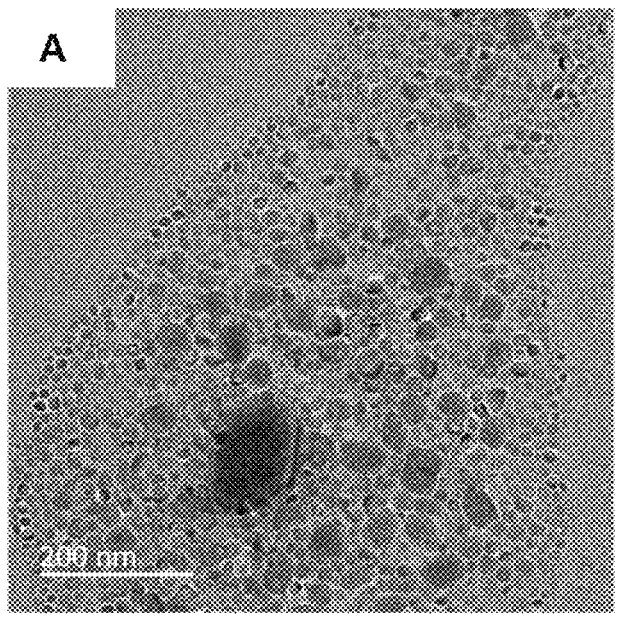
[FIG. 3B]
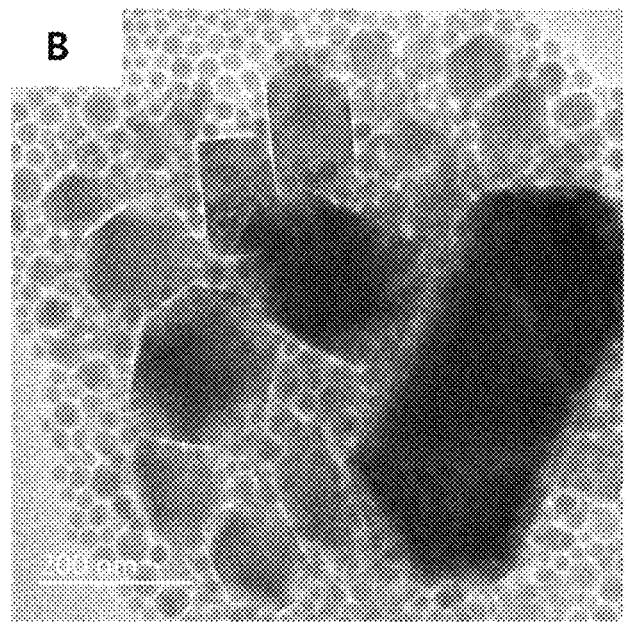

[FIG. 3C]
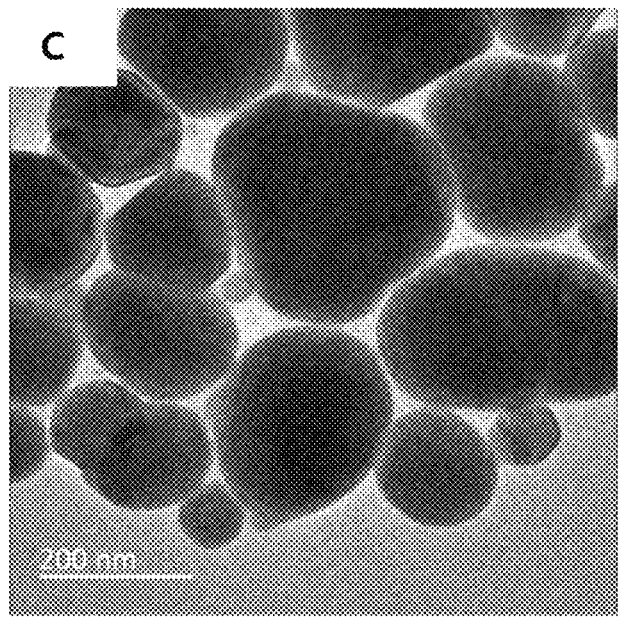
[FIG. 3D]
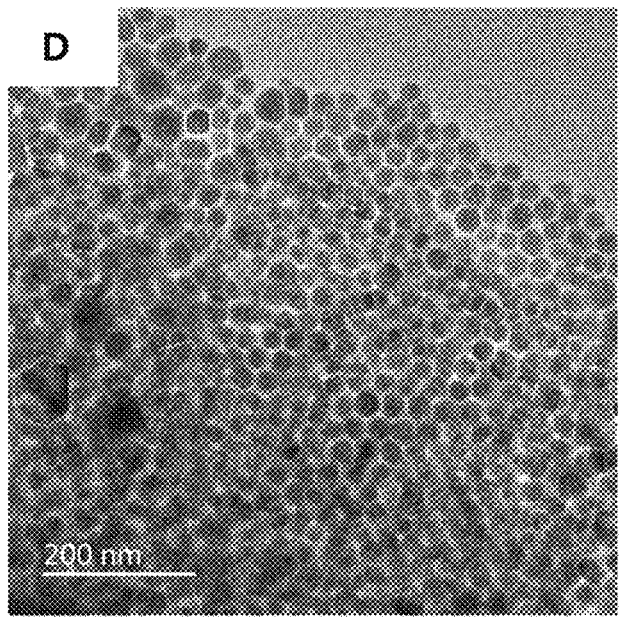

[FIG. 3E]
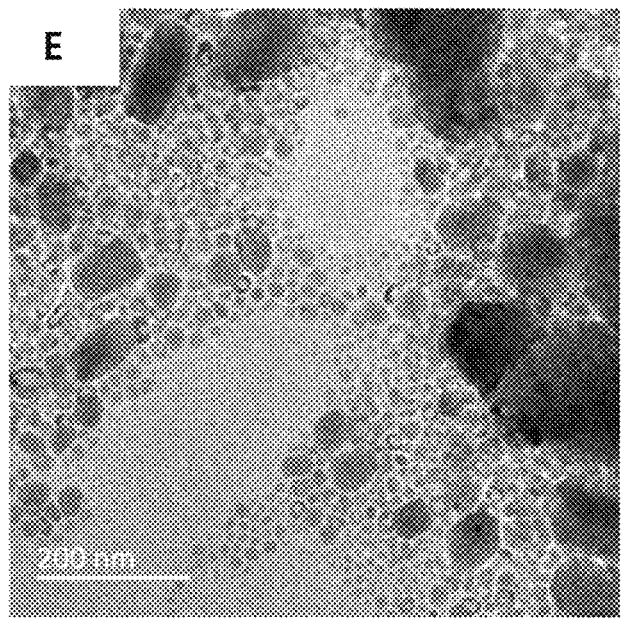
[FIG. 3F]
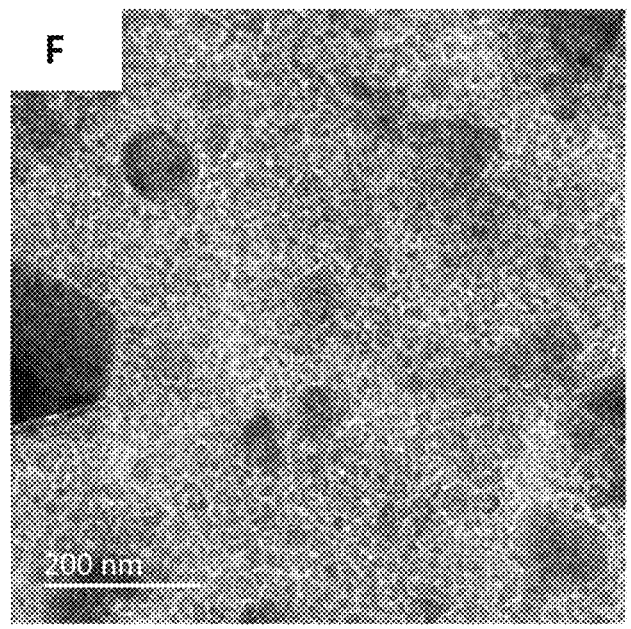

[FIG. 4]
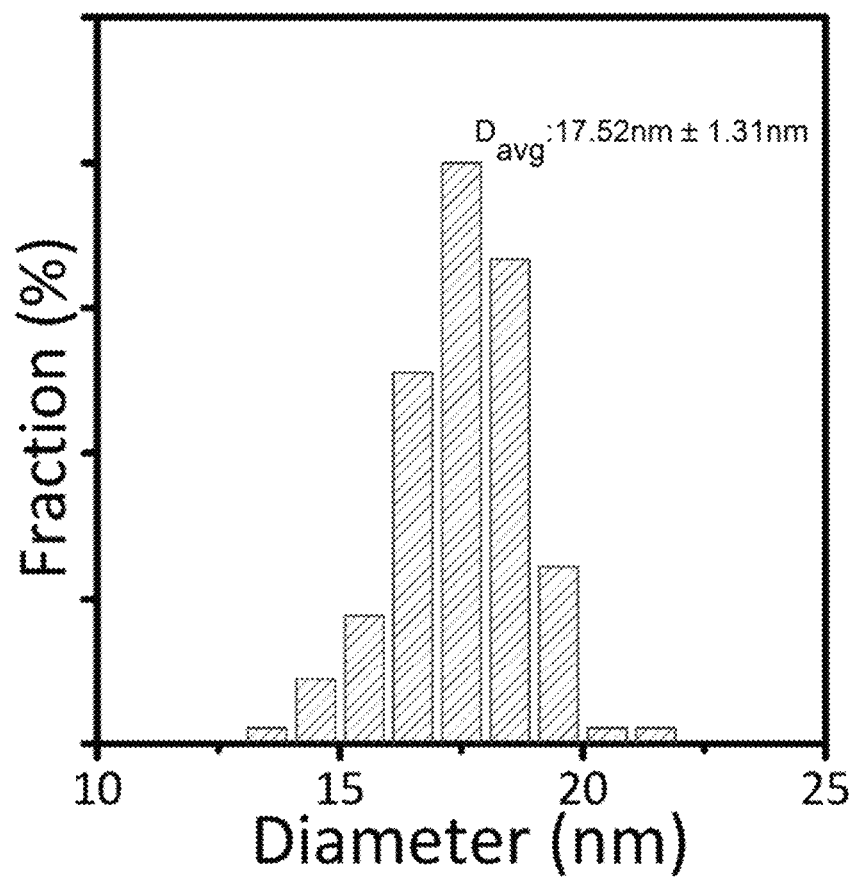

[FIG. 5A]
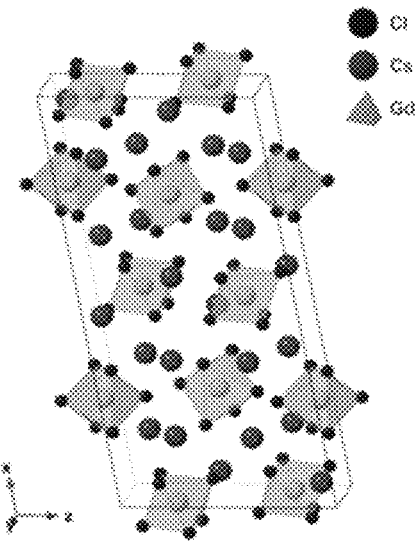
[FIG. 5B]
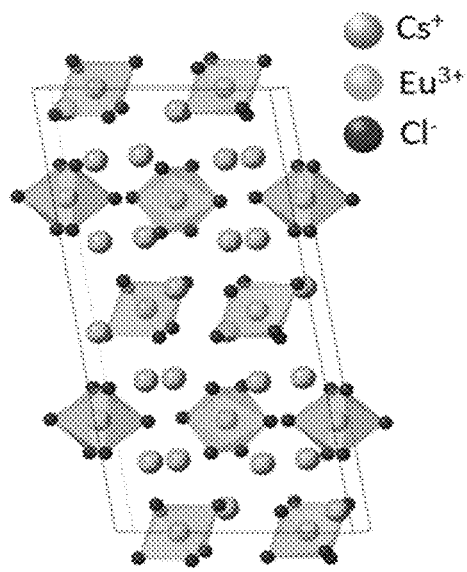

[FIG. 6]
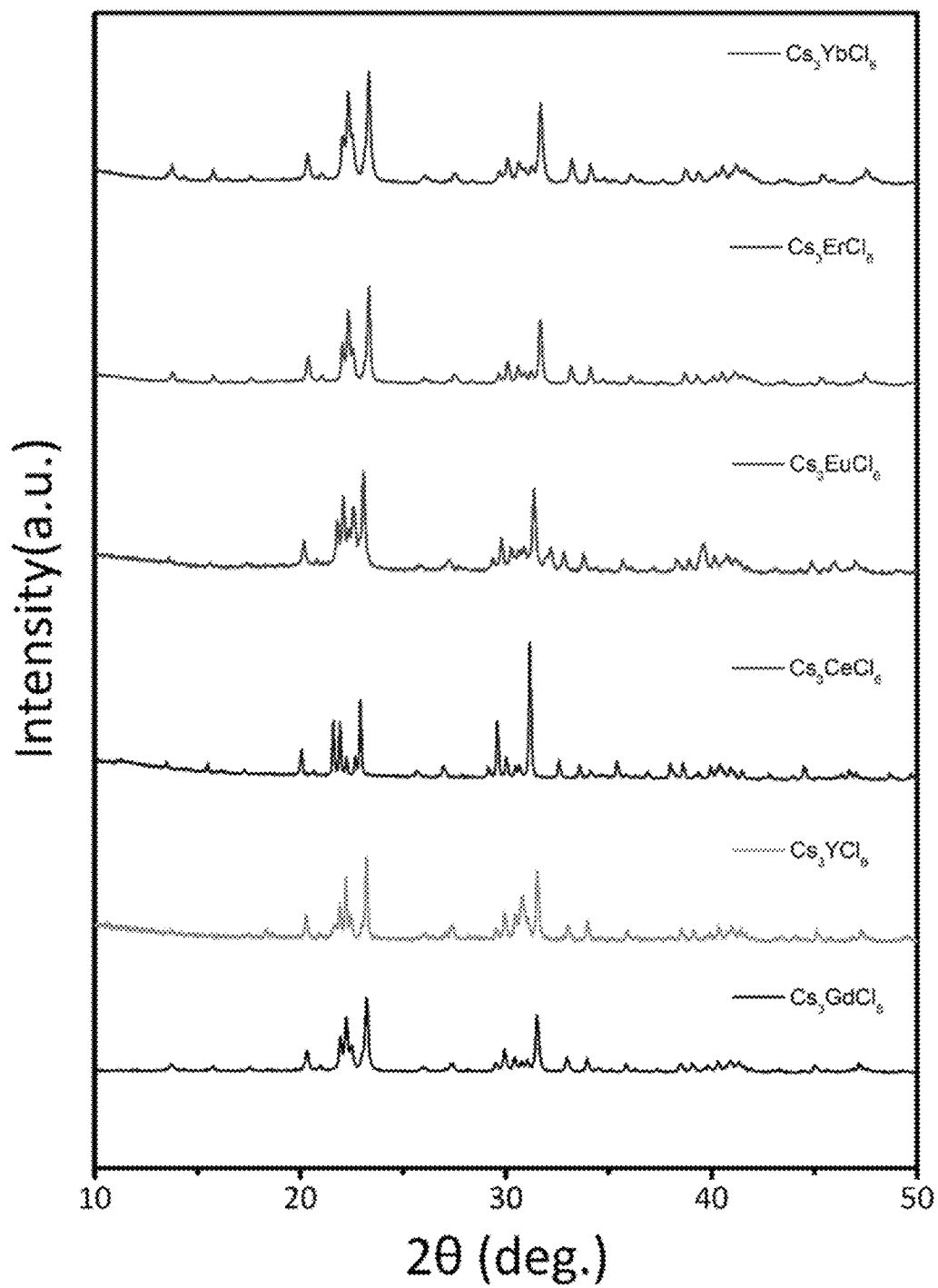

[FIG. 7A]
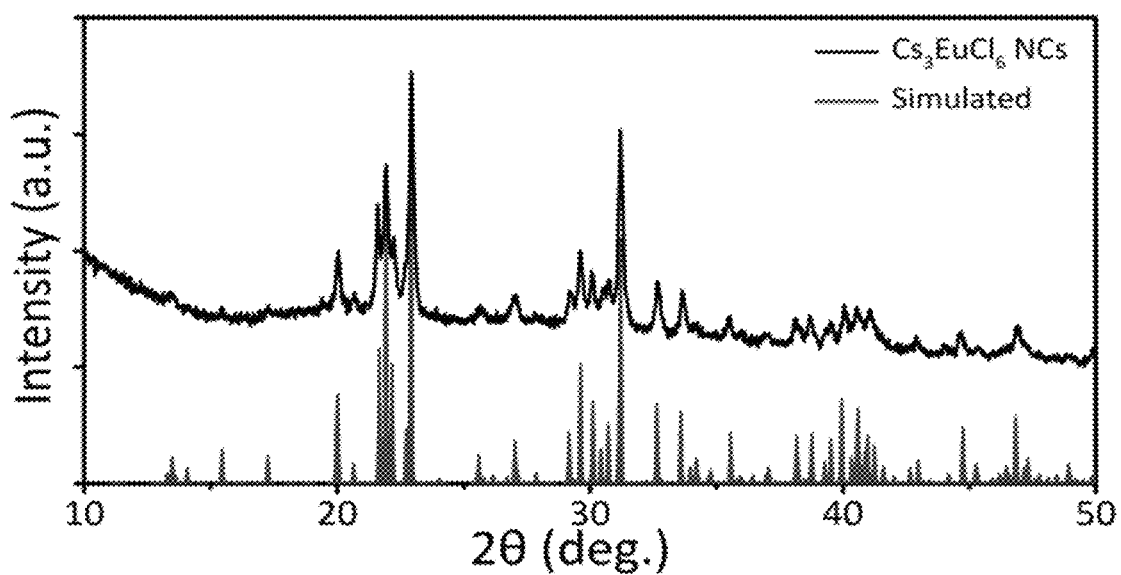
[FIG. 7B]
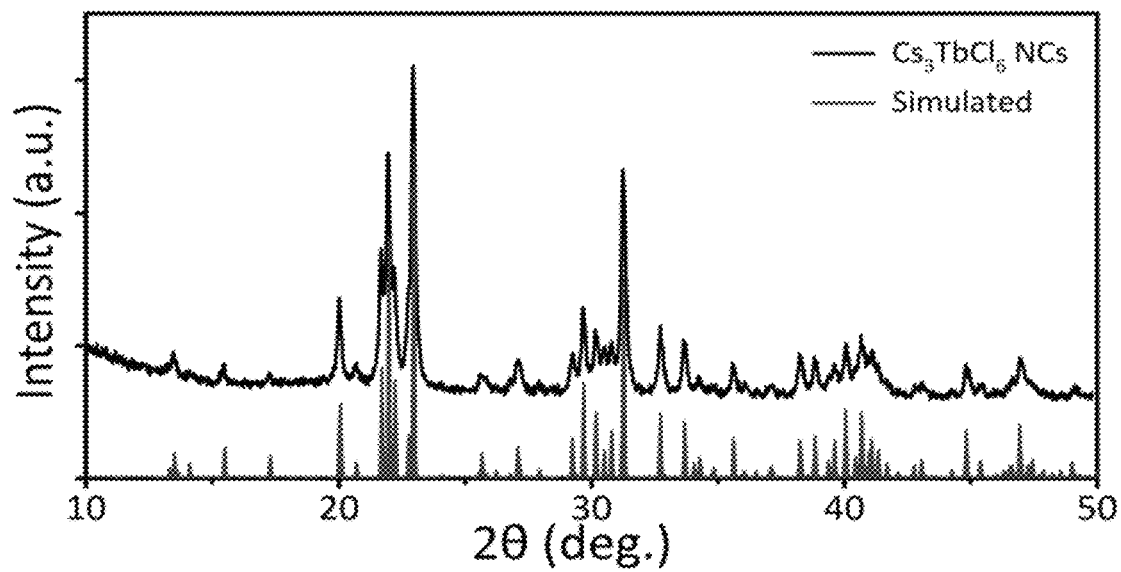

[FIG. 8A]
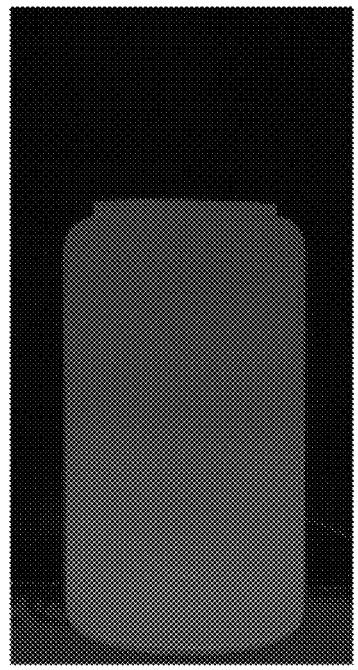
[FIG. 8B]
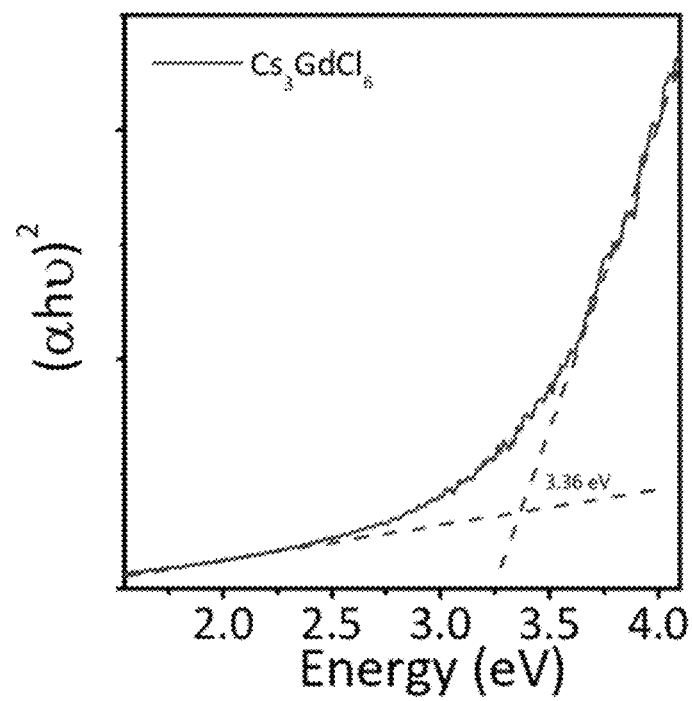

[FIG. 9A]
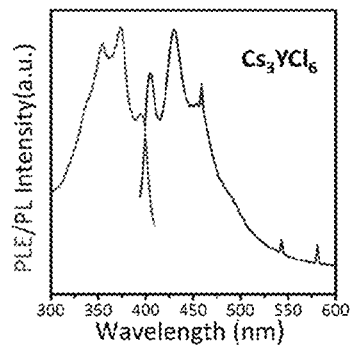
[FIG. 9B]
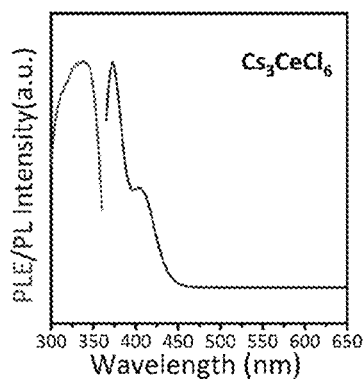
[FIG. 9C]
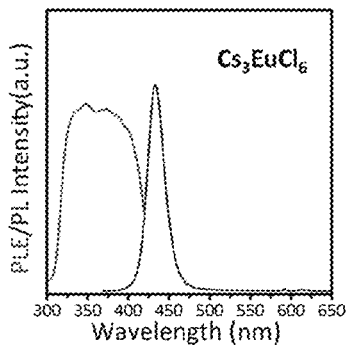

[FIG. 9D]
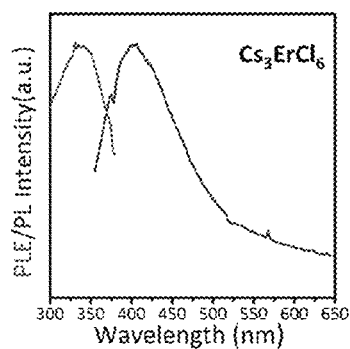
[FIG. 9E]
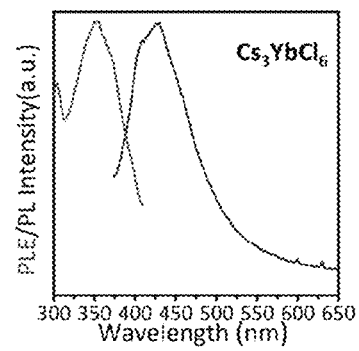
[FIG. 9F]
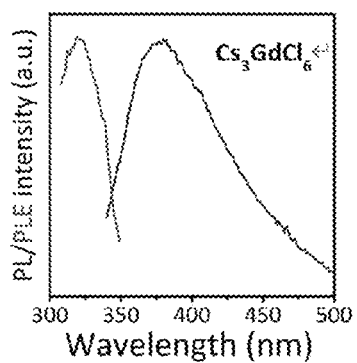

[FIG. 10A]
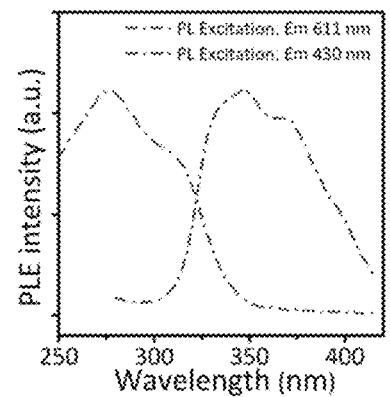
[FIG. 10B]
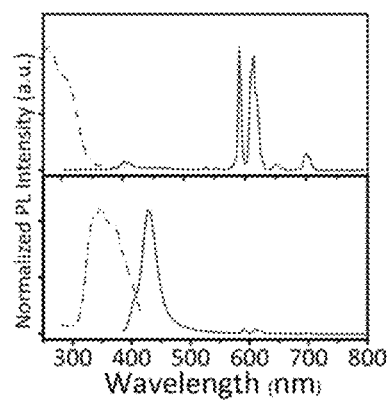
[FIG. 10C]
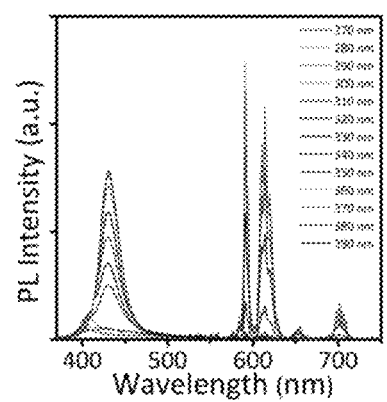

[FIG. 10D]
270 nm ← Excitation → 390 nm
[FIG. 11A]
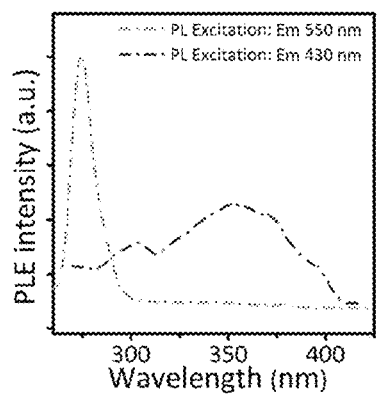
[FIG. 11B]
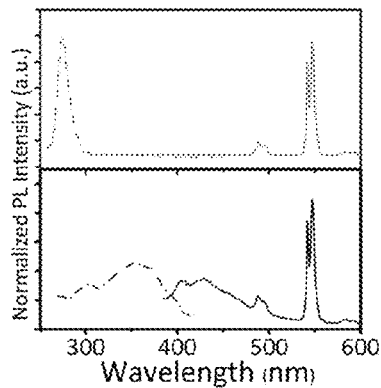

[FIG. 11C]
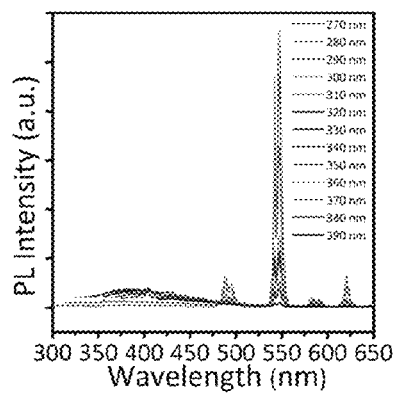
[FIG. 11D]
[FIG. 12A]
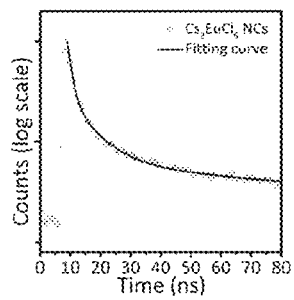
[FIG. 12B]
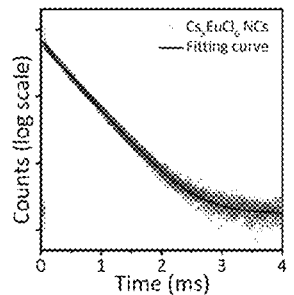

[FIG. 12C]
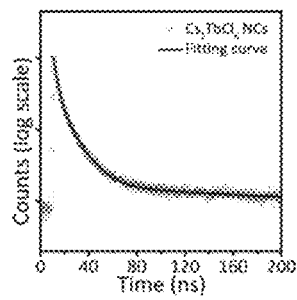
[FIG. 12D]
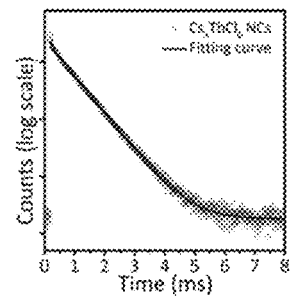
[FIG. 12E]
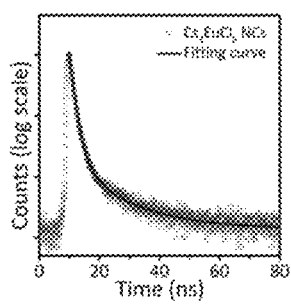
[FIG. 12F]
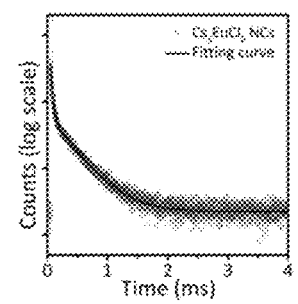

[FIG. 12G]
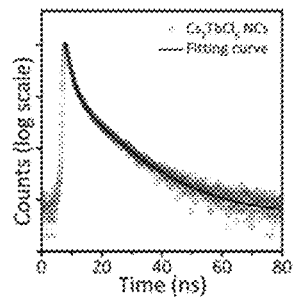
[FIG. 12H]
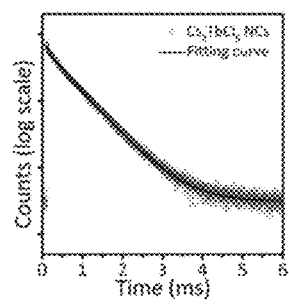

METAL HALIDE COLLOIDAL NANOPARTICLES AND METHOD FOR PRODUCING THE SAME

CROSS-REFERENCE TO RELATED APPLICATIONS

This application is based on and claims priority from Korean Patent Application No. 10-2022-0004884, filed on Jan. 12, 2022, and Korean Patent Application No. 10-2021-0004666, filed on Jan. 13, 2021 with the Korean Intellectual Property Office, the disclosures of which are incorporated herein in their entirety by reference.

TECHNICAL FIELD

The present disclosure relates to metal halide colloidal nanoparticles and a method for producing the same, and more specifically to rare-earth element-based zero-dimensional ternary metal halide colloidal nanoparticles and a method for producing the same.

BACKGROUND

Colloidal nanoparticles with a size of several to tens of nanometers are being used in various fields such as wavelength conversion materials for semiconductor displays and next-generation self-luminous materials. Blue light has high energy, and thus may be used as a base light source for emitting other light with relatively low energy using wavelength conversion materials. Thus, utility thereof is high.

In this regard, as colloidal nanoparticles emitting blue light, InGaP/ZnS type nanoparticles having gallium-doped indium phosphide as a core, and zinc sulfur as a shell, and ZnS or ZnSe as a II-V semiconductor having zinc as a cation and chalcogens such as S and Se as anions have been developed.

However, when cadmium is used as a quantum dot material for blue light-emission, high-efficiency blue light-emission may be achieved. However, the cadmium is toxic when used in large quantities. Thus, its use is regulated by RoHS (Restriction of Hazardous Substances Implemented in the EU).

Further, when ZnSe and InP quantum dots which are blue phosphors are free of a surface over-coating, it is difficult to realize high-efficiency blue light-emission.

Therefore, recently, ternary metal halide-based nanoparticles with excellent electrical and optical properties, known as light-emission nanoparticles for semiconductor displays, are being widely applied in the fields of light emitting bodies, photovoltaics, photocatalysts, and scintillators. Among them, perovskite-based nanoparticles are being actively studied.

Related prior literature is a non-patent document 3: J Shamsi et al., "Metal Halide Perovskite Nanocrystals: Synthesis, Post-Synthesis Modifications, and Their Optical Properties", Chem. Rev. On 2019, 119, 5, 3296-3348. In this document, lead (Pb)-based organic/inorganic or inorganic metal halide-based perovskite nanoparticles may render various luminescence colors depending on a particle size, shape, halide composition (F, Cl, Br, I) thereof, and may render various emission colors depending on the type of cations, and have high absolute luminous efficiency of 90%, narrow FWHM, and excellent color purity.

On the other hand, the optical and electrical properties of the ternary metal halide nanoparticles may be controlled based on the composition and crystal structure of the nanoparticles. Among the ternary metal halide nanoparticles, the perovskite crystal structure has an $ABX_3$ composition composed of metal-halide octahedrons $[BX_6]^-$ coupled to each other via a coordination bond and a monovalent cation (A). The metal-halide octahedrons share a halide element and are connected to each other in a three-dimension.

Perovskite generally refers to a structure in which metal-halide octahedrons are connected to each other in a three-dimension. Allowing structural diversity by adjusting the arrangement of octahedrons may allow the perovskite to be low-dimensional perovskite. The low-dimensional perovskite may include a ternary metal halide structure in which octahedrons are connected to each other in 2-dimension or 1-dimension, or a 0-dimensional ternary metal halide structure in which the metal-halide octahedral structures in the crystal structure are not connected to each other. The two-dimensional, one-dimensional, and zero-dimensional ternary metal halide structures are structurally similar to that composed of $[BX_6]^-$ octahedron and monovalent A cations. Further, since the A ion and the $BX_6$ ion interact with each other and the A component does not interfere with the $BX_6$ component, the two-dimensional, one-dimensional, and zero-dimensional ternary metal halide structures are included in the scope of perovskite.

However, these structures often do not have an A:B:X composition ratio of 1:1:3, and have a structure that the octahedrons are not arranged in three dimensions and thus are called perovskite derivatives or perovskite-related structures.

Related prior art literature is a non-patent document 4: Omar F. Mohammed, "Outstanding Challenges of Zero-Dimensional Perovskite Materials", J. Phys. Chem. Lett. On 2019, 10, 19, 5886-5888. In this document, it has been demonstrated that low-dimensional (1D, 0D) perovskite-based structures exhibit high exciton energy, low electrical conductivity, self-trapped properties, and high quantum efficiency luminescence properties.

However, lead-based perovskite or perovskite-based materials may not be commercialized because they cause harm to the human body and environmental problems due to the toxicity of lead.

Further, in order that a general inorganic nanoparticle light emitting material realizes a single color and controls a color, a particle size, structure, and composition thereof are changed to control light-emission characteristics of the particles. On the contrary, a multi-color light emitting material may induce change in the emission color only with an external signal without changing the characteristics of the particles, and thus are highly useful in various fields. The multi-color light emitting material (e.g., multi-color nanoparticles) is a material capable of controlling a light-emission color via external physical stimuli with reversible changes such as light, magnetic field, or electric field.

Multi-color nanoparticles may be used in various fields such as displays, optical sensors, anti-counterfeiting materials, and bio-imaging. For example, a conventional display has to use three RGB pixels individually. However, when the multi-color nanoparticles are used in the display, more than two colors may be rendered with one pixel. Thus, the number of pixels to be used may be reduced and the resolution may be improved. Further, the multi-color nanoparticles may be used in optical sensor devices that detect light by changing an emission color and wavelength according to an input signal.

A representative multi-color material may include carbon quantum dots (CQD), graphene quantum dots (GQD), manganese-doped semiconducting quantum dots (QD), and the like.

The currently reported carbon dot and graphene quantum dot-based multi-color fluorescent materials have a narrow fluorescence wavelength change of 100 nm or smaller, and thus have a limitation to rendering various fluorescence colors. The currently reported carbon dot and graphene quantum dot-based multi-color fluorescent materials have a large FWHM, and thus have a limitation to realizing excellent color purity. Further, the difference between emission intensity in the blue region and that in the red region is significant. When an excitation wavelength is changed, a light-emission wavelength also changes. Thus, a range of the excitation wavelength required to obtain a target light-emission wavelength is very narrow. Thus, an application thereof is limited Accordingly, there is a need for a single light emitting material for rendering various fluorescence colors in a reversible manner without changing the composition or properties of the particles.

PRIOR ART LITERATURE

Non-Patent Documents (Non-patent document 1) J Shamsi et al., "Metal Halide Perovskite Nanocrystals: Synthesis, Post-Synthesis Modifications, and Their Optical Properties", Chem. Rev. 2019, 119, 5, 3296-3348

(Non-patent document 2) Omar F. Mohammed, "Outstanding Challenges of Zero-Dimensional Perovskite Materials", J. Phys. Chem. Lett. 2019, 10, 19, 5886-5888

(Non-patent document 3) Ou Chen et al., "Excitation-Intensity-Dependent Color-Tunable Dual Emissions from Manganese-Doped CdS/ZnS Core/Shell Nanocrystals", Angew Chem Int Ed Engl. 2010 Dec. 27; 49(52):10132-5

(Non-patent document 4) Qi Sun et al., "Excitation-Dependent Emission Color Tuning from an Individual Mn-Doped Perovskite Microcrystal", J. Am. Chem. Soc. 2019, 141, 51, 20089-20096

SUMMARY

A purpose of the present disclosure is to solve the above problems and thus is to provide a rare-earth element-based zero-dimensional ternary metal halide colloidal nanoparticles with excellent luminous efficiency and capable of rendering various light-emission colors, and a method for producing the same.

Further, a purpose of the present disclosure is to provide a rare-earth element-based zero-dimensional ternary metal halide colloidal nanoparticles capable of controlling a light-emission wavelength based on change of an excitation wavelength and a method for producing the same.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

An exemplary embodiment of the present disclosure provides metal halide colloidal nanoparticles represented by a following Chemical Formula 1:

$$A_3MX_6 \quad \text{[Chemical Formula 1]}$$

in the Chemical Formula 1, A is an alkali metal element, M is a rare-earth metal element, and X is a halogen element.

A may be Cs, Rb, K, Na, Li, or a combination thereof, M may be gadolinium (Gd), yttrium (Y), ytterbium (Yb), erbium (Er), europium (Eu), cerium (Ce), terbium (Tb), or a combination thereof, and X may be F, Cl, Br, I, or a combination thereof.

An average particle diameter of each of the metal halide colloidal nanoparticles may be 1 to 100 nm.

The metal halide colloidal nanoparticles may absorb an excitation wavelength in a range of 250 to 320 nm and emit light in an emission spectrum of 500 to 570 nm or 580 to 630 nm, or may absorb an excitation wavelength in a range of 320 to 450 nm and emit light in an emission spectrum of 380 to 480 nm.

A surface of the metal halide colloidal nanoparticle may be coated with an organic ligand.

The organic ligand includes at least one selected from a group consisting of a compound derived from $R^1COOH$, a compound derived from $R^2NH_2$, a compound derived from $R^2R^3NH$, a compound derived from $R^2R^3R^4N$, and a compound derived from a first non-polar solvent. $R^1$, $R^2$, $R^3$ and $R^4$ may be the same as or different from each other, and each of $R^1$, $R^2$, $R^3$ and $R^4$ independently represents a saturated or unsaturated alkyl group having 2 to 28 carbon atoms.

$R^1COOH$ may be one selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid.

$R^2NH_2$ may be one selected from a group consisting of octylamine, nonylamine, heptylamine, hexylamine, pentylamine, hexadecanamine, octadecylamine, dodecylamine, trioctylamine, and oleylamine. $R^2R^3NH$ may be one selected from a group consisting of dimethylamine, diethylamine, dipropylamine, and dioctylamine. $R^2R^3R^4N$ may be trioctylamine.

The first non-polar solvent may be one selected from a group consisting of heptadecane, nonadecane, octadecene, heptadecane, dodecane, or octadecane.

Further, the present disclosure provides a method for producing metal halide colloidal nanoparticles, the method including (a) preparing a mixed solution including at least one selected from a group consisting of $R^1COOH$, $R^2NH_2$, $R^2R^3NH$, $R^2R^3R^4N$, and a first non-polar solvent; (b) adding an alkali metal precursor and a rare-earth metal precursor to the mixed solution and stirring the mixed solution to produce a stirred solution; and (c) reacting the stirred solution to produce metal halide colloidal nanoparticles represented by a following Chemical Formula 1, in which $R^1$, $R^2$, $R^3$ and $R^4$ may be the same as or different from each other, and each of $R^1$, $R^2$, $R^3$ and $R^4$ independently represents a saturated or unsaturated alkyl group having 2 to 28 carbon atoms.

$$A_3MX_6 \quad \text{[Chemical Formula 1]}$$

In the Chemical Formula 1, A is an alkali metal element, M is a rare-earth metal element, and X is a halogen element.

A may be Cs, Rb, K, Na, Li, or a combination thereof, M may be gadolinium (Gd), yttrium (Y), ytterbium (Yb), erbium (Er), europium (Eu), cerium (Ce), terbium (Tb), or a combination thereof, and X may be F, Cl, Br, I, or a combination thereof.

$R^1COOH$ may be one selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid.

$R^2NH_2$ may be one selected from a group consisting of octylamine, nonylamine, heptylamine, hexylamine, pentylamine, hexadecanamine, octadecylamine, dodecylamine, and oleylamine. $R^2R^3NH$ may be one selected from a group consisting of dimethylamine, diethylamine, dipropylamine, and dioctylamine. $R^2R^3R^4N$ may be trioctylamine.

The first non-polar solvent may be one selected from a group consisting of heptadecane, nonadecane, octadecene, heptadecane, dodecane, or octadecane.

In the step (a), $R^1COOH:R^2NH_2$, or $R^1COOH:R^2R^3NH$, or $R^1COOH:R^2R^3R^4N$ may be mixed with each other in a molar ratio of 1:0.5 to 2, and $R^1COOH$: the first non-polar solvent may be mixed with each other in a molar ratio of 1:10 to 40 to produce the mixed solution.

The step (b) may be a step of producing the stirred solution by stirring the mixed solution in a vacuum state at 100 to 150° C. for 1 to 10 hours.

The step (c) may be a step of producing metal halide colloidal nanoparticles by reacting the stirred solution at 200 to 285° C. for 15 to 120 minutes under presence of an inert gas.

The present disclosure provides a light emitting device including the metal halide colloidal nanoparticles.

Further, since the metal halide colloidal nanoparticles according to the present disclosure may impart the unique properties of a metal halide octahedron to the nanoparticles, thereby realizing the electrical and magnetic properties of rare-earths.

Further, the metal halide colloidal nanoparticles produced by the producing method of metal halide colloidal nanoparticles according to the present disclosure are in a form of colloids dispersed in a solution. The metal halide colloidal nanoparticles allow large-area thinning via microstructure fabrication using a solution process, and may be used in imaging fields that require a solution phase.

The effect of the present disclosure is not limited to the above effects. It should be understood that the present disclosure includes all effects that may be inferred from the detailed description of the present disclosure or the configurations of the inventions described in the claims.

According to the exemplary embodiments of the present disclosure, the metal halide nanoparticles according to the present disclosure may render various light-emission colors without doping dopants on the surfaces of nanoparticles or wrapping the surface of nanoparticles with the coating. In particular, the metal halide nanoparticles according to the present disclosure may act as not only a blue light emitting material to exhibit high luminance, but also a blue and green or blue and red light emitting material to exhibit high luminance, and thus may be used as a material that may replace a new blue phosphor or RGB pixel of a display.

That is, the metal halide nanoparticles according to the present disclosure may provide rare-earth element-based zero-dimensional ternary metal halide colloidal nanoparticles that may control the light-emission wavelength according to the change in the excitation wavelength.

Further, the metal halide nanoparticles according to the present disclosure may be applied to the field of optical multiplexing in which multiple signals may be transmitted simultaneously on one channel by utilizing the tunable characteristics of not only the excitation wavelength but also the excited state lifetime.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1A to FIG. 1L are a FE-TEM (Field Emission Transmission Electron Microscope) image of metal halide colloidal nanoparticles produced according to each of Present Examples 1 to 4 of the present disclosure.

FIG. 2A to FIG. 2F are a FE-TEM (Field Emission Transmission Electron Microscope) image of metal halide colloidal nanoparticles produced according to each of Present Examples 7 and 8 of the present disclosure.

FIG. 3A to FIG. 3F are a FE-TEM image of metal halide colloidal nanoparticles produced according to each of Comparative Examples 1 to 6 of the present disclosure.

FIG. 4 is a graph measuring the size of metal halide colloidal nanoparticles produced according to Present Example 1 of the present disclosure.

FIG. 5A and FIG. 5B are a crystal image of metal halide colloidal nanoparticles produced according to each of Present Example 1 and Present Example 7.

FIG. 6 is an X-ray diffraction analysis graph of metal halide colloidal nanoparticles produced according to each of Present Examples 1 to 6.

FIG. 7A and FIG. 7B are an X-ray diffraction analysis graph of metal halide colloidal nanoparticles produced according to each of Present Examples 7 and 8.

FIG. 8A and FIG. 7B are an image and graph showing the results of analyzing the light-emission characteristics of metal halide colloidal nanoparticles produced according to Present Example 1.

FIG. 9A to FIG. 9F are a graph showing the results of analyzing the light-emission characteristics of metal halide colloidal nanoparticles produced according to each of Present Examples 1 to 6.

FIG. 10A to FIG. 10D are an image and graph showing the results of analyzing the light-emission characteristics of metal halide colloidal nanoparticles produced according to Present Example 7.

FIG. 11A to FIG. 11D are an image and graph showing the results of analyzing the light-emission characteristics of metal halide colloidal nanoparticles produced according to Present Example 8.

FIG. 12A to FIG. 12H are a graph showing the excited state lifetime of metal halide colloidal nanoparticles produced according to each of Present Examples 7 and 8.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

It should be noted that in the following descriptions, only the parts necessary to understand the embodiments of the present disclosure will be described, and the description of other parts may be omitted to the extent that the gist of the present disclosure is not disturbed.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, the embodiments as described in this specification and the configuration shown in the drawings are only preferred embodiments of the present disclosure, and do not represent all the technical ideas of the present disclosure. Thus, it should be understood that, at the time of filing this application, there may be various equivalents and variations.

Hereinafter, the present disclosure will be described in detail.

Metal Halide Colloidal Nanoparticles

According to one embodiment of the present disclosure, the present disclosure provides metal halide colloidal nanoparticles represented by a following Chemical Formula 1:

$$A_3MX_6 \qquad \text{[Chemical Formula 1]}$$

in the Chemical Formula 1, A is an alkali metal element, M is a rare-earth metal element, and X is a halogen element.

Specifically, in the Chemical Formula 1, A may be Cs, Rb, K, Na, Li, or a combination thereof, M may be gadolinium (Gd), yttrium (Y), ytterbium (Yb), erbium (Er), europium (Eu), cerium (Ce), terbium (Tb), or a combination thereof, and X may be F, Cl, Br, I, or a combination thereof.

The metal halide colloidal nanoparticles represented by the Chemical Formula 1 of the present disclosure are rare-earth-based lead-free metal halide colloidal nanoparticles and may implement the unique electrical and magnetic characteristics of rare-earth metal atoms, and may be commercialized because there are few harmful effects to the human body and environmental problems, and may render various light-emission colors and may have excellent light-emission efficiency.

The metal halide colloidal nanoparticles according to the present disclosure may be specifically rare-earth element-based zero-dimensional ternary metal halide colloidal nanoparticles, more specifically, perovskite-based colloidal nanoparticles.

In the present disclosure, the term "metal halide colloidal nanoparticles" refers to a colloidal state in which metal halide nanoparticles are dispersed in a solvent to prevent decomposition of particles by moisture exposure.

In the present disclosure, the term "metal halide multi-light-emission nanoparticles" may reversibly change the light-emission color to green, red or blue by adjusting the excitation wavelength.

In the present disclosure, the term "ternary" may mean including A, M, and X, as three main elements.

In the present disclosure, the term "zero-dimensional" may mean a case in which a nanoparticle or a crystal thereof takes a form of a sphere.

In the rare-earth element-based zero-dimensional ternary metal halide colloidal nanoparticles, the coordinated metal octahedrons are spatially separated from each other via surrounding inorganic cations, resulting in a strong exciton confinement effect and a self-trapped exciton emission effect. The self-trapped exciton emission originates from the lattice deformation of the metal halide structure and has several typical features, such as broadband PL emission and large stokes shift, thereby imparting the characteristics of rare-earth as a central atom of the isolated octahedral to ternary metal halide colloidal nanoparticles.

According to one embodiment of the present disclosure, the average particle diameter of each of the metal halide colloidal nanoparticles may be 1 to 100 nm, specifically 1 to 60 nm, more specifically 10 to 30 nm. When the average particle diameter of each of the metal halide colloidal nanoparticles is within the above range, electrical and optical characteristics may be controlled via size control.

The metal halide colloidal nanoparticles according to the present disclosure may control the light-emission wavelength according to the change of the excitation wavelength, and may perform light-emission in a light-emission spectrum of 300 nm to 800 nm.

Further, the metal halide colloidal nanoparticles according to the present disclosure may be applied to the field of optical multiplexing which may transmit multiple signals simultaneously on one channel by utilizing the tunable characteristics of not only the excitation wavelength but also the excited state lifetime.

As the atomic number of the halogen element X in the Chemical Formula 1 increases, the metal halide colloidal nanoparticles may implement a longer wavelength.

For example, when X is Cl in the Chemical Formula 1, the metal halide colloidal nanoparticles may implement a shorter wavelength than that when X is Br. When Cs is used as an alkali metal element in the Chemical Formula 1, and Cl is used as a halogen element, the metal halide colloidal nanoparticles may implement a maximum fluorescence wavelength.

According to one embodiment of the present disclosure, the metal halide colloidal nanoparticles according to the present disclosure may absorb excitation wavelengths in a range of 250 to 320 nm and emit light in a light-emission spectrum in a range of 500 to 570 nm or 580 to 630 nm. According to one embodiment of the present disclosure, the metal halide colloidal nanoparticles according to the present disclosure may absorb the excitation wavelength in a range of 320 to 450 nm and may emit light in the light-emission spectrum of 380 to 480 nm. However, the disclosure is not limited thereto.

In a specific example, when the metal halide colloidal nanoparticles are $Cs_3GdCl_6$, $Cs_3YCl_6$, $Cs_3YbCl_6$, $Cs_3ErCl_6$, $Cs_3EuCl_6$, $Cs_3EuCl_6$, $Cs_3CeCl_6$ or $Cs_3TbCl_6$, the metal halide colloidal nanoparticles may absorb the excitation wavelength in a range of 320 to 450 nm, and may emit the blue light in a light-emission spectrum in a range of 380 to 480 nm.

Further, in another specific example, when the metal halide colloidal nanoparticles are $Cs_3EuCl_6$, the metal halide colloidal nanoparticles may absorb the excitation wavelength in 320 to 450 nm, and emit blue light in a light-emission spectrum in a range of 380 to 480 nm. The metal halide colloidal nanoparticles may absorb the excitation wavelength in 250 to 320 nm, and may emit red light in a light-emission spectrum in a range of 580 to 630 nm. Thus, the metal halide colloidal nanoparticles may perform multiple light-emission.

Further, when the metal halide colloidal nanoparticles are $Cs_3TbCl_6$, the metal halide colloidal nanoparticles may absorb the excitation wavelength in 320 to 450 nm and emit blue light in the light-emission spectrum in a range of 380 to 480 nm, and may absorb the excitation wavelength in 250 to 320 nm and may emit green light in a light-emission spectrum in a range of 500 to 570 nm. Thus, the metal halide colloidal nanoparticles may perform multiple light-emission.

According to one embodiment of the present disclosure, each of the metal halide colloidal nanoparticles may have an organic ligand coated on a surface thereof.

The organic ligand may include at least one selected from a group consisting of a compound derived from $R^1COOH$, a compound derived from $R^2NH_2$, a compound derived from $R^2R^3NH$, a compound derived from $R^2R^3R^4N$, and a compound derived from a first non-polar solvent.

In the compound derived from $R^1COOH$ and the compounds derived from $R^2NH_2$, $R^2R^3NH$, and $R^2R^3R^4N$, $R^1$, $R^2$, $R^3$ and $R^4$ may be the same as or different from each other, and each of $R^1$, $R^2$, $R^3$ and $R^4$ independently represents a saturated or unsaturated alkyl group having 2 to 28 carbon atoms.

Specifically, each of $R^1$, $R^2$, $R^3$ and $R^4$ may be a saturated linear alkyl group having 12 to 20 carbon atoms or an unsaturated linear alkyl group having one double bond. More specifically, $R^1COOH$ may be a saturated or unsaturated fatty acid. For example, $R^1COOH$ may be one selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid. However, the disclosure is not limited thereto.

$R^2NH_2$ may be one selected from a group consisting of octylamine, nonylamine, heptylamine, hexylamine, pentylamine, hexadecanamine, octadecylamine, dodecylamine, and oleylamine. However, the disclosure is not limited thereto.

$R^2R^3NH$ may be one selected from a group consisting of dimethylamine, diethylamine, dipropylamine, and dioctylamine. However, the disclosure is not limited thereto.

$R^2R^3R^4N$ may be trioctylamine. However, the disclosure is not limited thereto.

The first non-polar solvent may be a hydrocarbon having 5 to 20 carbon atoms. Specifically, the first non-polar solvent may be a linear saturated or unsaturated hydrocarbon. For example, the first non-polar solvent may be at least one selected from a group consisting of heptadecane, nonadecane, octadecene, heptadecane, dodecane, octadecane. The present disclosure is not limited thereto.

According to one embodiment of the present disclosure, the metal halide colloidal nanoparticles may have the organic ligand coated on the surface of the nanoparticles to exhibit high dispersibility in a non-polar solvent. Thus, the metal halide nanoparticles solution in which the metal halide nanoparticles are dispersed in a non-polar solvent may be produced. Thus, the metal halide colloidal nanoparticles may be applied to a technical field requiring dispersibility such as solution process-based large-area thinning or scintillator.

In one example, the metal halide colloidal nanoparticles may exist in a liquid phase in which the nanoparticles are dispersed in a non-polar solvent to prevent decomposition of the particles due to exposure to moisture. However, the metal halide colloidal nanoparticles may be in a solid phase or powder phase rather than the solution phase. In this case, the metal halide colloidal nanoparticles may mean metal halide nanoparticles.

The non-polar solvent may be at least one selected from a group consisting of hexane, toluene, heptane, octane, carbon tetrachloride, chloroform, dichloroethane, benzene, xylene, N-methylpyrrolidone, tetrahydrofuran, nitrobenzene, N,N-dimethylformamide, dimethyl sulfoxide, diethyl carbonate, benzyl acetate, dimethyl glutarate, ethylacetoacetate, isobutyl isobutanoate, isobutyl acetate, meta-cresol, and combinations thereof. However, the disclosure is not limited thereto. Specifically, the non-polar solvent may be hexane, chloroform, or toluene.

Further, the present disclosure provides a light emitting device including the metal halide colloidal nanoparticles according to the present disclosure.

The light emitting device according to the present disclosure may be applied to a display device, an infrared sensor, an anti-forgery code, or a solar cell to which both infrared and ultraviolet absorption/emission are applied.

In a specific example, the metal halide colloidal nanoparticles according to the present disclosure may control the excitation wavelength to simultaneously render not only blue, but also blue and green, or blue and red light-emission characteristics. In this way, since various colors may be emitted based on the absorbed wavelength, the metal halide colloidal nanoparticles may be applied not only to multi-mode bio-imaging, but also to display, photodetectors, and anti-counterfeiting.

Method of Producing Metal Halide Colloidal Nanoparticles

Further, the present disclosure provides a method for producing metal halide colloidal nanoparticles, the method including (a) preparing a mixed solution including at least one selected from a group consisting of $R^1COOH$, $R^2NH_2$, $R^2R^3NH$, $R^2R^3R^4N$, and a first non-polar solvent; (b) adding an alkali metal precursor and a rare-earth metal precursor to the mixed solution and stirring the mixed solution to produce a stirred solution; and (c) reacting the stirred solution to produce metal halide colloidal nanoparticles represented by a following Chemical Formula 1, in which $R^1$, $R^2$, $R^3$ and $R^4$ may be the same as or different from each other, and each of $R^1$, $R^2$, $R^3$ and $R^4$ independently represents a saturated or unsaturated alkyl group having 2 to 28 carbon atoms:

$$A_3MX_6 \qquad \text{[Chemical Formula 1]}$$

in the Chemical Formula 1, A is an alkali metal element, M is a rare-earth metal element, and X is a halogen element.

Specifically, in the Chemical Formula 1, A may be Cs, Rb, K, Na, Li, or a combination thereof, M may be gadolinium (Gd), yttrium (Y), ytterbium (Yb), erbium (Er), europium (Eu), cerium (Ce), terbium (Tb), or a combination thereof, and X may be F, Cl, Br, I, or a combination thereof.

First, a mixed solution containing at least one selected from a group consisting of $R^1COOH$, $R^2NH_2$, $R^2R^3NH$, $R^2R^3R^4N$, and a first non-polar solvent is prepared.

The mixed solution containing at least one selected from a group consisting of $R^1COOH$, $R^2NH_2$, $R^2R^3NH$, $R^2R^3R^4N$, and a first non-polar solvent may be an organic ligand coated on the surface of the final product, that is, the metal halide nanoparticles.

The metal halide colloidal nanoparticles as the final product according to the present disclosure may have the organic ligand coated on the surface of the nanoparticles to exhibit high dispersibility in a non-polar solvent. Thus, the metal halide nanoparticles solution in which the metal halide nanoparticles are dispersed in a non-polar solvent may be produced. Thus, the metal halide colloidal nanoparticles may be applied to a technical field requiring dispersibility such as solution process-based large-area thinning or scintillator.

In the compound derived from $R^1COOH$ and the compounds derived from $R^2NH_2$, $R^2R^3NH$, and $R^2R^3R^4N$, $R^1$, $R^2$, $R^3$ and $R^4$ may be the same as or different from each other, and each of $R^1$, $R^2$, $R^3$ and $R^4$ independently represents a saturated or unsaturated alkyl group having 2 to 28 carbon atoms.

Specifically, each of $R^1$, $R^2$, $R^3$ and $R^4$ may be a saturated linear alkyl group having 12 to 20 carbon atoms or an unsaturated linear alkyl group having one double bond. More specifically, $R^1COOH$ may be a saturated or unsaturated fatty acid. For example, $R^1COOH$ may be one selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid. However, the disclosure is not limited thereto.

$R^2NH_2$ may be one selected from a group consisting of octylamine, nonylamine, heptylamine, hexylamine, pentylamine, hexadecanamine, octadecylamine, dodecylamine, and oleylamine. However, the disclosure is not limited thereto.

$R^2R^3NH$ may be one selected from a group consisting of dimethylamine, diethylamine, dipropylamine, and dioctylamine. However, the disclosure is not limited thereto.

$R^2R^3R^4N$ may be trioctylamine.

The first non-polar solvent may be a hydrocarbon having 5 to 20 carbon atoms. Specifically, the first non-polar solvent may be a linear saturated or unsaturated hydrocarbon. For example, the first non-polar solvent may be one selected from a group consisting of heptadecane, nonadecane, octadecene, heptadecane, dodecane, octadecane.

According to one embodiment of the present disclosure, in the step of preparing the mixed solution, $R^1COOH$:$R^2NH_2$, or $R^1COOH$:$R^2R^3NH$, or $R^1COOH$:$R^2R^3R^4N$ may be mixed with each other in a molar ratio of 1:0.5 to 2, preferably 1:1. $R^1COOH$: the first non-polar solvent may be mixed with each other in a molar ratio of 1:10 to 40, preferably 1:10 to 40, more preferably 1:11 to 15 to prepare a mixed solution.

In this connection, when a content of $R^1COOH$ corresponds to a value lower than the lower limit of the molar ratio range, the size and shape of the metal halide nanoparticles as the product may be non-uniformly synthesized, and alkali metal precursor-derived compound (e.g., CsCl) particles may be generated. When a content of $R^1COOH$ corresponds to a value higher than the upper limit of the molar ratio range, the size and shape of the metal halide nanoparticles increases rapidly, so that the size and shape may be non-uniformly synthesized.

Further, when a content of each of $R^2NH_2$, $R^2R^3NH$, and $R^2R^3R^4N$ corresponds to a value lower than the lower limit of the molar ratio range, the size and shape of the metal halide nanoparticles as the product may be non-uniformly synthesized. When a content of each of $R^2NH_2$, $R^2R^3NH$, and $R^2R^3R^4N$ corresponds to a value higher than the upper limit of the molar ratio range, the size and shape of the metal halide nanoparticles may be non-uniformly synthesized, and alkali metal precursor-derived compound (e.g., CsCl) particles may be generated.

Further, when a content of the first non-polar solvent corresponds to a value lower than the lower limit of the molar ratio range, the size and shape of the metal halide nanoparticles may be non-uniformly synthesized, and alkali metal precursor-derived compound (e.g., CsCl) particles may be generated. When a content of the first non-polar solvent corresponds to a value higher than the upper limit of the molar ratio range, the size of the metal halide colloidal nanoparticles may rapidly increase and may be non-uniformly synthesized.

According to one embodiment of the present disclosure, the step of preparing the mixed solution may include mixing 1.5 to 9 mmol, specifically 3 to 6 mmol, more specifically 4.5 mmol of R'COOH with 1.5 to 9 mmol, specifically 3 to 6 mmol, more specifically 4.5 mmol of $R^2NH_2$, and further adding 30 to 90 mmol of the first non-polar solvent, specifically 60 mmol thereof thereto.

Further, according to another embodiment of the present disclosure, the step of preparing the mixed solution may include mixing 1.5 to 9 mmol, specifically 3 to 6 mmol, more specifically 4.5 mmol of R'COOH with 1.5 to 9 mmol, specifically 3 to 6 mmol, more specifically 4.5 mmol of $R^2R^3NH$, and further adding 30 to 90 mmol of the first non-polar solvent, specifically 60 mmol thereof thereto.

Further, according to still another embodiment of the present disclosure, the step of preparing the mixed solution may include mixing 1.5 to 9 mmol, specifically 3 to 6 mmol, more specifically 4.5 mmol of R'COOH with 1.5 to 9 mmol, specifically 3 to 6 mmol, more specifically 4.5 mmol of $R^2R^3R^4N$, and further adding 30 to 90 mmol of the first non-polar solvent, specifically 60 mmol thereof thereto.

The non-polar solvent may be at least one selected from a group consisting of hexane, toluene, heptane, octane, carbon tetrachloride, chloroform, dichloroethane, benzene, xylene, N-methylpyrrolidone, tetrahydrofuran, nitrobenzene, N,N-dimethylformamide, dimethyl sulfoxide, diethyl carbonate, benzyl acetate, dimethyl glutarate, ethylacetoacetate, isobutyl isobutanoate, isobutyl acetate, meta-cresol, and combinations thereof. However, the disclosure is not limited thereto. Specifically, the non-polar solvent may be hexane, chloroform, or toluene.

Next, an alkali metal precursor and a rare-earth metal precursor are added to the mixed solution and then the mixed solution is stirred to produce a stirred solution.

Specifically, the stirred solution is produced by adding and dissolving an alkali metal precursor and a rare-earth metal precursor to the mixed solution, and then, stirring the mixed solution in a vacuum state at 100 to 150° C., specifically 100 to 125° C., for 1 to 10 hours, specifically for 1 to 4 hours to produce the stirred solution.

In this connection, when the stirring temperature and time are outside the above temperature and time ranges, the particles may be non-uniformly generated.

The alkali metal precursor may be one selected from a group consisting of CsF, RbF, KF, NaF, LiF, CsCl, RbCl, KCl, NaCl, LiCl, CsBr, RbBr, KBr, NaBr, LiBr, CsI, RbI, KI, Nat, and LiI. The disclosure is not limited thereto.

The alkali metal precursor may be added in a molar ratio of 1 to 30 based on 100 moles of the first non-polar solvent of the mixed solution.

In one embodiment of the present disclosure, the alkali metal precursor may be added in an amount of 1 to 10 mmol, specifically 4 to 9 mmol, relative to an amount of 30 to 90 mmol of the first non-polar solvent. When a content of the alkali metal precursor is outside the above range, impurities such as CsCl may be generated, or the structure and size of particles may be non-uniform.

The rare-earth metal precursor may be Y halide, Ce halide, Pr halide, Nd halide, Pm halide, Sm halide, Eu halide, Gd halide, Tb halide, Dy halide, Ho halide, Er halide, Tm halide, Yb halide, Lu halide, or a combination thereof. However, the disclosure is not limited thereto.

Specifically, the rare-earth metal precursor may be $YF_3$, $YCl_3$, $YBr_3$, $YI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, TbBr₃, TbI₃, DyF₃, DyCl₃, DyBr₃, DyI₃, HoF₃, HoCl₃, HoBr₃, HoI₃, ErF₃, ErCl₃, ErBr₃, ErI₃, TmF₃, TmCl₃, TmBr₃, TmI₃, YbF₃, YbCl₃, YbBr₃, YbI₃, LuF₃, LuCl₃, LuBr₃, LuI₃ or combinations thereof. However, the disclosure is not limited thereto.

The rare-earth metal precursor may be added in a molar ratio of 0.01 to 20 based on 100 moles of the first non-polar solvent of the mixed solution.

In one embodiment of the present disclosure, the rare-earth metal precursor may be added in an amount of 0.1 to 5 mmol, specifically 0.5 to 3 mmol, based on an amount of 30 to 90 mmol of the first non-polar solvent. When a content of the rare-earth metal precursor is outside the above range, the structure and size of the particles may be non-uniform.

Next, the stirred solution reacts to produce the metal halide colloidal nanoparticles represented by a following Chemical Formula 1:

$$A_3MX_6 \qquad \text{[Chemical Formula 1]}$$

in the Chemical Formula 1, A is an alkali metal element, M is a rare-earth metal element, and X is a halogen element.

Specifically, the producing of metal halide colloidal nanoparticles represented by the Chemical Formula 1 may be achieved by reacting the stirred solution under the presence of an inert gas at 200 to 285° C., specifically 240 to 280° C., 15 minutes to 120 minutes, specifically 30 minutes to 90 minutes.

In this connection, when the reaction temperature is lower than 200° C., alkali metal precursor nanoparticles (e.g., CsCl) may be obtained as a reaction by-product. Thus, due to the nature of the process, it may be difficult to remove only CsCl to produce pure metal halide nanoparticles represented by the Chemical Formula 1.

Further, when the reaction temperature exceeds 285° C., MOCl (in this case, M is the same as M in the Chemical Formula 1 of the present disclosure) nanoparticles having a size exceeding 100 nm may be synthesized, and thus the produced nanoparticles may be easily decomposed by light and heat energy.

The inert gas may be nitrogen, helium, argon, or a mixture thereof. In a specific example, the inert gas may be nitrogen. Each of the metal halide colloidal nanoparticles may have an average particle diameter of 1 to 100 nm, specifically 1 to 60 nm, and more specifically, 10 to 30 nm. When the average particle diameter of the metal halide colloidal nanoparticles is within the above range, electrical and optical characteristics may be controlled via size control.

The metal halide colloidal nanoparticles produced in this way may control the light-emission wavelength according to the change in the excitation wavelength, and may perform light-emission in a light-emission spectrum of 300 nm to 800 nm.

Further, the metal halide colloidal nanoparticles according to the present disclosure may be applied to the field of optical multiplexing, which may transmit multiple signals simultaneously on one channel by utilizing the tunable characteristics of not only the excitation wavelength but also the excited state lifetime.

As the atomic number of the halogen element X in the Chemical Formula 1 increases, the metal halide colloidal nanoparticles may implement a longer wavelength.

For example, when X is Cl in the Chemical Formula 1, the metal halide colloidal nanoparticles may implement a shorter wavelength than that when X is Br. When Cs is used as an alkali metal element in the Chemical Formula 1, and Cl is used as a halogen element, the metal halide colloidal nanoparticles may implement a maximum fluorescence wavelength.

According to one embodiment of the present disclosure, the metal halide colloidal nanoparticles according to the present disclosure may absorb excitation wavelengths in a range of 250 to 320 nm and emit light in a light-emission spectrum in a range of 500 to 570 nm or 580 to 630 nm. According to one embodiment of the present disclosure, the metal halide colloidal nanoparticles according to the present disclosure may absorb the excitation wavelength in a range of 320 to 450 nm and may emit light in the light-emission spectrum of 380 to 480 nm. However, the disclosure is not limited thereto.

In a specific example, when the metal halide colloidal nanoparticles are $Cs_3GdCl_6$, $Cs_3YCl_6$, $Cs_3YbCl_6$, $Cs_3ErCl_6$, $Cs_3EuCl_6$, $Cs_3EuCl_6$, $Cs_3CeCl_6$ or $Cs_3TbCl_6$, the metal halide colloidal nanoparticles may absorb the excitation wavelength in a range of 320 to 450 nm, and may emit the blue light in a light-emission spectrum in a range of 380 to 480 nm.

Further, in another specific example, when the metal halide colloidal nanoparticles are $Cs_3EuCl_6$, the metal halide colloidal nanoparticles may absorb the excitation wavelength in 320 to 450 nm, and emit blue light in a light-emission spectrum in a range of 380 to 480 nm. The metal halide colloidal nanoparticles may absorb the excitation wavelength in 250 to 320 nm, and may emit red light in a light-emission spectrum in a range of 580 to 630 nm. Thus, the metal halide colloidal nanoparticles may perform multiple light-emission.

Further, when the metal halide colloidal nanoparticles are $Cs_3TbCl_6$, the metal halide colloidal nanoparticles may absorb the excitation wavelength in 320 to 450 nm and emit blue light in the light-emission spectrum in a range of 380 to 480 nm, and may absorb the excitation wavelength in 250 to 320 nm and may emit green light in a light-emission spectrum in a range of 500 to 570 nm. Thus, the metal halide colloidal nanoparticles may perform multiple light-emission.

In one example, the method of producing metal halide colloidal nanoparticles according to the present disclosure may further include reacting the stirred solution to produce metal halide colloidal nanoparticles represented by the Chemical Formula 1, and lowering a reaction temperature to room temperature, adding the produced metal halide colloidal nanoparticles to a non-polar solvent, and performing centrifugation to obtain precipitated metal halide colloidal nanoparticles, and drying the precipitated metal halide colloidal nanoparticles. In this case, the produced nanoparticles may be used in a solid phase or a powder phase, and may mean metal halide nanoparticles.

Further, the method of producing metal halide colloidal nanoparticles according to the present disclosure may further include reacting the stirred solution to produce metal halide colloidal nanoparticles represented by the Chemical Formula 1, and lowering a reaction temperature to room temperature, adding the produced metal halide colloidal nanoparticles to a non-polar solvent, and performing centrifugation to obtain precipitated metal halide colloidal nanoparticles, and re-dispersing and keeping the precipitated metal halide colloidal nanoparticles in a non-polar solvent to prevent decomposition of the particles due to moisture exposure. In this case, the produced nanoparticles may be used in a liquid phase, and may mean metal halide colloidal nanoparticles.

As described above, the technical idea of the present disclosure is described using one embodiment. Various modifications and variations may be made by those of ordinary skill in the technical field to which the present disclosure belongs without deviating from the essential characteristics of the present disclosure. Therefore, the embodiments as described in the present disclosure are for describing rather than limiting the technical idea of the present disclosure, and the scope of the technical idea of the present disclosure is not limited to the embodiments. The protection scope of the present disclosure should be interpreted by the claims, and all technical ideas within the scope equivalent thereto should be construed as being included in the scope of the present disclosure.

Hereinafter, the present disclosure will be described in more detail based on examples.

EXAMPLES

Present Example 1: $Cs_3GdCl_6$ Production

A mixed solution containing 1.5 ml (4.5 mmol) of oleic acid, 1.5 ml (4.5 mmol) of oleylamine, and 20 ml (60 mmol) of octadecene was prepared in a 50 ml three-necked flask. 0.7542 g (4.48 mmol) of CsCl as an alkali metal precursor and 0.2954 g (0.87 mmol) of $GdCl_3$ as a rare-earth metal precursor were added to the mixed solution and dissolved, and then the mixed solution was stirred for 2 hours in a vacuum state at 120° C. to produce a stirred solution. Then, an inside of the flask was filled with nitrogen and the stirred solution reacted at 260° C. for 1 hour to produce a solution containing white metal halide colloidal nanoparticles.

Thereafter, the reaction temperature was lowered to room temperature, and a solution containing the produced metal halide colloidal nanoparticles and toluene were mixed with each other in a 1:1 volume ratio. After centrifugation at 8000 rpm for 2 minutes, the supernatant was removed, and the precipitated metal halide colloidal nanoparticles were separated and put in a glove box, and then dispersed in toluene and stored.

Present Example 2: $Cs_3EuCl_6$ Production

A method as that in Present Example 1 was performed under the same conditions as those in Present Example 1 except that $EuCl_3$ was used instead of $GdCl_3$ as a rare-earth metal precursor.

Present Example 3: $Cs_3ErCl_6$ Production

A method as that in Present Example 1 was performed under the same conditions as those in Present Example 1 except that $ErCl_3$ was used instead of $GdCl_3$ as a rare-earth metal precursor.

Present Example 4: $Cs_3YbCl_6$ Production

A method as that in Present Example 1 was performed under the same conditions as those in Present Example 1 except that $YbCl_3$ was used instead of $GdCl_3$ as a rare-earth metal precursor.

Present Example 5: $Cs_3CeCl_6$ Production

A method as that in Present Example 1 was performed under the same conditions as those in Present Example 1 except that $CeCl_3$ was used instead of $GdCl_3$ as a rare-earth metal precursor.

Present Example 6: $Cs_3YCl_6$ Production

A method as that in Present Example 1 was performed under the same conditions as those in Present Example 1 except that $YCl_3$ was used instead of $GdCl_3$ as a rare-earth metal precursor.

Present Example 7: $Cs_3EuCl_6$ Production

A method as that in Present Example 1 was performed under the same conditions as those in Present Example 1 except that 0.2892 g (1.12 mmol) of $EuCl_3$ was used instead of 0.2954 g (0.87 mmol) of $GdCl_3$ as a rare-earth metal precursor, and the reaction was performed at 260° C. for 45 minutes instead of reacting at 260° C. for 1 hour.

Present Example 8: $Cs_3TbCl_6$ Production

A method as that in Present Example 1 was performed under the same conditions as those in Present Example 1 except that 0.2971 g (1.12 mmol) of $TbCl_3$ was used instead of 0.2954 g (0.87 mmol) of $GdCl_3$ as a rare-earth metal precursor.

COMPARATIVE EXAMPLES

Comparative Example 1: $Cs_3GdCl_6$ when Oleic Acid was Used in an Amount Below an Appropriate Range A method as that in Present Example 1 was performed under the same conditions as those in Present Example 1 except that 1 ml of oleic acid was used instead of 1.5 ml of oleic acid.

Comparative Example 2: $Cs_3GdCl_6$ when Oleic Acid was Used in an Amount Above an Appropriate Range A method as that in Present Example 1 was performed under the same conditions as those in Present Example 1 except that 2 ml of oleic acid was used instead of 1.5 ml of oleic acid.

Comparative Example 3: $Cs_3GdCl_6$ when Oleic Acid was Used in an Amount Above an Appropriate Range A method as that in Present Example 1 was performed under the same conditions as those in Present Example 1 except that 2.5 ml of oleic acid was used instead of 1.5 ml of oleic acid.

Comparative Example 4: $Cs_3GdCl_6$ when Oleylamine was Used in an Amount Below an Appropriate Range A method as that in Present Example 1 was performed under the same conditions as those in Present Example 1 except that 1 ml of oleic acid was used instead of 1.5 ml of oleylamine.

Comparative Example 5: $Cs_3GdCl_6$ when Oleylamine was Used in an Amount Above an Appropriate Range A method as that in Present Example 1 was performed under the same conditions as those in Present Example 1 except that 2 ml of oleic acid was used instead of 1.5 ml of oleylamine.

Comparative Example 6: $Cs_3GdCl_6$ when Oleylamine was Used in an Amount Above an Appropriate Range A method as that in Present Example 1 was performed under the same conditions as those in Present Example 1 except that 2.5 ml of oleic acid was used instead of 1.5 ml of oleylamine.

EXPERIMENTAL EXAMPLES

Experimental Example 1: Morphological Analysis

A powder sample of metal halide colloidal nanoparticles obtained by drying metal halide colloidal nanoparticles dispersed in toluene produced according to each of Present Examples 1 to 4 and Present Examples 7 and 8 was analyzed using a transmission electron microscope (FE-TEM, JEOL JEM-F200) operating with a 100 kV voltage accelerator. The result is shown in FIG. 1A to FIG. 1L and FIG. 2A to FIG. 2F.

Specifically, FIG. 1A is a $Cs_3GdCl_6$ FE-TEM image at low magnification (X 40 K), FIG. 1B is a $Cs_3GdCl_6$ FE-TEM image at low magnification (X 80 K), FIG. 1C is a $Cs_3GdCl_6$ FE-TEM image at high magnification (X 200 K), and FIG. 1D is a $Cs_3EuCl_6$ FE-TEM image at low magnification (X 40 K), FIG. 1E is a $Cs_3EuCl_6$ FE-TEM image at low magnification (X 80 K), FIG. 1F is a $Cs_3EuCl_6$ FE-TEM image at high magnification (X 120 K), FIG. 1G is a $Cs_3ErCl_6$ FE-TEM image at low magnification (X 40 K), and FIG. 1H is a $Cs_3ErCl_6$ FE-TEM image at low magnification (X 80 K), FIG. 1I is a $Cs_3ErCl_6$ FE-TEM image at high magnification (X 100 K), FIG. 1J is a $Cs_3YbCl_6$ FE-TEM image at low magnification (X 40 K), FIG. 1K is a $Cs_3YbCl_6$ FE-TEM image at low magnification (X 80 K), FIG. 1L is a $Cs_3YbCl_6$ FE-TEM image at high magnification (X 160 K), and FIG. 2A is a $Cs_3EuCl_6$ FE-TEM image at low magnification (X 40 K), FIG. 2B is a $Cs_3EuCl_6$ FE-TEM image at low magnification (X 80 K), FIG. 2C is a $Cs_3EuCl_6$ FE-TEM image at high magnification (X 200 K), FIG. 2D is a $Cs_3TbCl_6$ FE-TEM image at low magnification (X 40 K), FIG. 2E is a $Cs_3TbCl_6$ FE-TEM image at low magnification (X 80 K), FIG. 2F is a $Cs_3TbCl_6$ FE-TEM image at high magnification (X 200 K).

Referring to FIG. 1A to FIG. 1L and FIG. 2A to FIG. 2F, it was identified that all of the metal halide colloidal nanoparticles produced according to each of Present Examples 1 to 4 and Present Examples 7 and 8 were uniform, and the average particle diameter thereof was 1 to 100 nm, specifically 1 to 30 nm.

Further, in order to identify change in the size of metal halide colloidal nanoparticles based on the contents of oleic acid and oleylamine, a powder sample of metal halide colloidal nanoparticles obtained by drying metal halide colloidal nanoparticles dispersed in toluene as produced according to each of Comparative Examples 1 to 6 was analyzed using a transmission electron microscope (FE-TEM, JEOL JEM-F200) operating with a 200 kV voltage accelerator. A result is shown in FIG. 3A to FIG. 3F.

Specifically, FIG. 3A is a FE-TEM image when the amount of oleic acid is adjusted to 1 ml. FIG. 3B is a FE-TEM image when the amount of oleic acid is adjusted to 2 ml. FIG. 3C is a FE-TEM image when the amount of oleic acid is adjusted to 2.5 ml. FIG. 3D is a FE-TEM image when the amount of oleylamine is adjusted to 1 ml. FIG. 3E is a FE-TEM image when the amount of oleylamine is adjusted to 2 ml. FIG. 3F is a FE-TEM image when the amount of oleylamine is adjusted to 2.5 ml.

Referring to FIG. 3A to FIG. 3F, it was identified that when the amount of oleic acid was increased to an amount more than 1.5 ml, the particle size rapidly increased and became very non-uniform. On the other hand, it was identified that when the amount of oleic acid was decreased to an amount less than 1.5 ml, the size of the particles decreased, but nanoparticles of non-uniform size and shape were synthesized, and CsCl nanoparticles were generated.

Further, it was identified that the uniformity of size and the shape of the particles decreased when the amount of oleylamine was smaller than 1.5 ml or exceeded the appropriate range. In particular, it was identified that CsCl was generated when an amount of oleylamine was 2.5 ml or more.

Experimental Example 2: Particle Size

The metal halide colloidal nanoparticles powder sample obtained by drying the metal halide colloidal nanoparticles dispersed in toluene as produced according to Present Example 1 was measured and identified using FE-TEM and JEOL JEM-F200.

Referring to FIG. 4, it was identified that the average size of the synthesized metal halide colloidal nanoparticles was 20.19 nm.

Experimental Example 3: Crystal Structure and Crystallinity

FIG. 5A and FIG. 5B show the crystal structure of the metal halide colloidal nanoparticles obtained by drying the metal halide colloidal nanoparticles dispersed in toluene as produced according to each of Present Example 1 and Present Example 7 as calculated using a crystal maker. FIG. 5A shows the crystal structure of $Cs_3GdCl_6$ produced according to Present Example 1, and FIG. 5B shows the crystal structure of $Cs_3EuCl_6$ produced according to Present Example 7.

The crystallinity of the metal halide colloidal nanoparticles powder sample obtained by drying the metal halide colloidal nanoparticles dispersed in toluene produced according to each of Present Examples 1 to 6 and Present Examples 7 and 8 was identified based on X-ray diffraction measurement thereof.

The sample was placed on an X-ray diffractometer operating at 40 kV and 40 mA [XRD, Bruker-AXS New D8-Advance system, Cu radiation ($\lambda$=0.154 nm)]. X-ray diffraction images were obtained by scanning the sample at 2 $\theta$ at a speed of 0.02° sec$^{-1}$ in a range of 10° to 50°, and the results are shown in FIG. 6, FIG. 7A and FIG. 7B.

FIG. 6 is an X-ray diffraction analysis graph of metal halide colloidal nanoparticles produced according to each of Present Examples 1 to 6. Referring to FIG. 6, it may be identified that all of the peaks of the x-ray diffraction pattern of the crystal grains indicate the formation of a stable crystal structure.

FIG. 7A is an X-ray diffraction analysis graph of metal halide colloidal nanoparticles produced according to Present Example 7, and FIG. 7B is an X-ray diffraction analysis graph of metal halide colloidal nanoparticles produced according to Present Example 8. Referring to FIG. 7A and FIG. 7B, it may be identified that all of the peaks of the x-ray diffraction pattern of the crystal grains indicate the formation of a stable crystal structure.

Experimental Example 4: Light-Emission Characteristics

The light-emission characteristics of the metal halide colloidal nanoparticles powder sample obtained by drying the metal halide colloidal nanoparticles dispersed in toluene produced according to each of Present Example 1 to Present Example 8 were measured and identified using a JASCO V-770 spectrometer.

FIG. 8A is an image of metal halide colloidal nanoparticles produced according to Present Example 1 as measured at 365 nm wavelength using a UV-lamp. Referring to FIG. 8A, light-emission of blue light at a wavelength of 365 nm may be identified.

FIG. 8B is a size measurement graph of metal halide colloidal nanoparticles produced according to Present Example 1. Referring to FIG. 8B, a band energy value calculated in absorption was 3.36 eV.

The light-emission characteristics of metal halide colloidal nanoparticle film produced by drying metal halide colloidal nanoparticles dispersed in toluene produced according to each of Present Example 1 to Present Example 8 on a glass substrate were measured and identified with Edinburgh FS5 and the results are shown in FIG. 9A to FIG. 9F, FIG. 10A to FIG. 10D, and FIG. 11A to FIG. 11D.

FIG. 9A to FIG. 9F are the light-emission spectrum (PL spectra) of the metal halide colloidal nanoparticles produced according to each of Present Examples 1 to 6.

Referring to FIG. 9A to FIG. 9F, $Cs_3YCl_6$ nanoparticles exhibit excitation 373 nm and light-emission (luminescence) 430 nm values (FIG. 9A), $Cs_3CeCl_6$ nanoparticles exhibit excitation 337 nm and light-emission (luminescence) 373 nm values (FIG. 9B), $Cs_3EuCl_6$ nanoparticles exhibit excitation 349 nm and light-emission (luminescence) 434 nm values (FIG. 9C), $Cs_3ErCl_6$ nanoparticles exhibit excitation 335 nm, and light-emission (luminescence) 406 nm values (FIG. 9D), $Cs_3YbCl_6$ nanoparticles exhibit excitation 354 nm, and light-emission (luminescence) 429 nm values (FIG. 9E), and $Cs_3GdCl_6$ nanoparticles exhibit excitation 324 nm and light-emission (luminescence) 381 nm values (FIG. 9F).

Thus, it was identified that the rare-earth element-based ternary metal halide nanoparticles were excited in the UV region and emitted light in a blue region, and each element thereof exhibited unique light-emission characteristics.

FIG. 10A to FIG. 10D are a light-emission spectrum (PL spectra) and light-emission image of metal halide colloidal nanoparticles produced according to Present Example 7.

Specifically, FIG. 10A is a light-emission spectrum graph showing excitation values measured at 430 nm and 611 nm as the light-emission (luminescence) values of $Cs_3EuCl_6$ nanoparticles produced according to Present Example 7. FIG. 10B is a graph showing the light-emission (luminescence) value by the $Cs_3EuCl_6$ nanoparticles structure and the light-emission (luminescence) value by an f-f forbidden transition of Eu. FIG. 10C is a light-emission spectrum graph showing the change value of the light-emission (luminescence) of $Cs_3EuCl_6$ nanoparticles when the excitation wavelength is changed by 10 nm. FIG. 10D shows the light-emission image of $Cs_3EuCl_6$ nanoparticles when the excitation wavelength is changed by 10 nm.

FIG. 11A to FIG. 11D show the light-emission spectrum (PL spectra) and light-emission images of metal halide colloidal nanoparticles produced according to Present Example 8.

Specifically, FIG. 11A is a light-emission spectrum graph showing excitation values measured at 430 nm and 550 nm as the light-emission (luminescence) values of $Cs_3TbCl_6$ nanoparticles produced according to Present Example 8. FIG. 11B is a graph showing the light-emission (luminescence) value by the structure of $Cs_3TbCl_6$ nanoparticles and the light-emission (luminescence) value by the f-f forbidden transition of Tb. FIG. 11C is a light-emission spectrum graph showing the change value in light-emission (luminescence) of $Cs_3TbCl_6$ nanoparticles when the excitation wavelength is changed by 10 nm, and FIG. 11D shows the light-emission image of $Cs_3TbCl_6$ nanoparticles when the excitation wavelength is changed by 10 nm.

FIG. 12A to FIG. 12H are a graph showing the excited state lifetime of metal halide colloidal nanoparticles produced according to each of Present Examples 7 and 8.

Time-resolved light-emission attenuation data of a metal halide colloidal nanoparticle film prepared by drying metal halide colloidal nanoparticles dispersed in toluene produced according to each of Present Example 7 and Present Example 8 on a glass substrate were measured using a HORIBA Fluorolog-3 with a single photon-counting photomultiplier tube (PMT) at a 374 nm pulsed laser diode.

FIG. 12A shows that the excited state lifetime value measured at 430 nm of light-emission wavelength is 14.93 ns when 264 nm of photoluminescence excitation is applied to $Cs_3EuCl_6$ nanoparticles. FIG. 12B shows that when 264 nm of photoluminescence excitation is applied to $Cs_3EuCl_6$ nanoparticles, the excited state lifetime value measured at 590 nm of light-emission wavelength is 3.88 ms. FIG. 12C shows that when 264 nm of photoluminescence excitation is applied to $Cs_3TbCl_6$ nanoparticles, the excited state lifetime value measured at 430 nm of light-emission wavelength is 7.12 ns. FIG. 12D shows that when 264 nm of photoluminescence excitation is applied to $Cs_3TbCl_6$ nanoparticles, the excited state lifetime value measured at 550 nm of light-emission wavelength is 5.5 ms. FIG. 12E shows that when 374 nm of photoluminescence excitation is applied to $Cs_3EuCl_6$ nanoparticles, the excited state lifetime value measured at 430 nm of light-emission wavelength is 1.31 ns. FIG. 12F shows that the excited state lifetime value measured at 590 nm of light-emission wavelength is 21.3 µs when 374 nm of photoluminescence excitation is applied to $Cs_3EuCl_6$ nanoparticles. FIG. 12G shows that when 374 nm of photoluminescence excitation is applied to $Cs_3TbCl_6$ nanoparticles, the excited state lifetime measured at 430 nm of light-emission wavelength is 2.16 ns. FIG. 12H shows that when 374 nm of photoluminescence excitation is applied to $Cs_3TbCl_6$ nanoparticles, the excited state lifetime value measured at 550 nm of light-emission wavelength is 5.51 ms.

Thus, a conventional fluorescent color coding may not identify optical signals as computer signals due to spectral overlap and background interference. Light spectra of $Cs_3EuCl_6$ and $Cs_3TbCl_6$ according to the present disclosure do not overlap each other, but also light-emission characteristics thereof due to particle structure have a short excited state lifetime of several nanometers. The lanthanide cation which is an octahedral central ion has a very long excited state lifetime of several tens of microseconds due to the f-f forbidden transition. Thus, $Cs_3EuCl_6$ and $Cs_3TbCl_6$ according to the present disclosure may identify the optical signal without spectral overlap.

Therefore, the metal halide colloidal nanoparticles according to the present disclosure may be applied to the field of optical multiplexing which may transmit multiple signals simultaneously on one channel by utilizing the tunable characteristics of not only the excitation wavelength but also the excited state lifetime.

The above disclosure has described the specific examples about the metal halide colloidal nanoparticles and the method for producing the same according to the present disclosure. However, it is obvious that various modifications are possible without deviating from the scope of the present disclosure.

Therefore, the scope of the present disclosure should not be limited to the described examples, and should be determined based on the claims described below as well as the claims and equivalents.

That is, it should be understood that the above-described example is illustrative in all respects and not restrictive. The scope of the present disclosure is indicated by the claims to be described later rather than the detailed description, and all changes or modifications derived from the meaning and scope of the claims and their equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. Metal halide colloidal nanoparticles represented by the following Chemical Formula 1:

$$A_3MX_6 \qquad \text{[Chemical Formula 1]}$$

wherein in the Chemical Formula 1, A is an alkali metal element, M is a rare-earth metal element, and X is a halogen element, wherein the metal halide colloidal nanoparticles absorb an excitation wavelength in a range of 250 to 320 nm and thus emit light in a light-emission spectrum of 500 to 570 nm or 580 to 630 nm, and wherein the metal halide colloidal nanoparticles absorb an excitation wavelength in a range of 320 to 450 nm and thus emit light in a light-emission spectrum of 380 to 480 nm.

2. The metal halide colloidal nanoparticles of claim 1, wherein A is Cs, Rb, K, Na, Li, or a combination thereof,
M is gadolinium (Gd), yttrium (Y), ytterbium (Yb), erbium (Er), europium (Eu), cerium (Ce), terbium (Tb), or a combination thereof, and
X is F, Cl, Br, I, or a combination thereof.

3. The metal halide colloidal nanoparticles of claim 1, wherein an average particle diameter of each of the metal halide colloidal nanoparticles is in a range of 1 to 100 nm.

4. The metal halide colloidal nanoparticles of claim 1, wherein a surface of the metal halide colloidal nanoparticle is coated with an organic ligand.

5. The metal halide colloidal nanoparticles of claim 4, wherein the organic ligand includes at least one selected from a group consisting of a compound derived from $R^1COOH$, a compound derived from $R^2NH_2$, a compound derived from $R^2R^3NH$, a compound derived from $R^2R^3R^4N$, and a compound derived from a first non-polar solvent,
wherein $R^1$, $R^2$, $R^3$ and $R^4$ are the same as or different from each other, and each of $R^1$, $R^2$, $R^3$ and $R^4$ independently represents a saturated or unsaturated alkyl group having 2 to 28 carbon atoms.

6. The metal halide colloidal nanoparticles of claim 5, which are coated with an organic ligand including a compound derived from $R^1COOH$, wherein $R^1COOH$ comprises one acid selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid.

7. The metal halide colloidal nanoparticles of claim 5, which are coated with an organic ligand including a compound derived from $R^2NH_2$, or a compound derived from $R^2R^3NH$, or a compound derived from $R^2R^3R^4N$, wherein $R^2NH_2$ comprises one amine selected from a group consisting of octylamine, nonylamine, heptylamine, hexylamine, pentylamine, hexadecanamine, octadecylamine, dodecylamine, and oleylamine,
wherein $R^2R^3NH$ comprises one amine selected from a group consisting of dimethylamine, diethylamine, dipropylamine, and dioctylamine, wherein $R^2R^3R^4N$ comprises trioctylamine.

8. The metal halide colloidal nanoparticles of claim 5, wherein the first non-polar solvent comprises at least one solvent selected from a group consisting of heptadecane, nonadecane, octadecene, heptadecane, dodecane, or octadecane.

9. A method for producing metal halide colloidal nanoparticles, the method comprising:
(a) preparing a mixed solution including $R^1COOH$, $R^2NH_2$, $R^2R^3NH$, or $R^2R^3R^4N$, and a first non-polar solvent,
wherein $R^1$, $R^2$, $R^3$ and $R^4$ are the same as or different from each other, and each of $R^1$, $R^2$, $R^3$ and $R^4$ independently represents a saturated or unsaturated alkyl group having 2 to 28 carbon atoms;
(b) adding an alkali metal precursor and a rare-earth metal precursor to the mixed solution and stirring the mixed solution to produce a stirred solution; and
(c) reacting the stirred solution to produce metal halide colloidal nanoparticles represented by a following Chemical Formula 1, $$A_3MX_6 \qquad \text{[Chemical Formula 1]}$$

wherein in the Chemical Formula 1, A is an alkali metal element, M is a rare-earth metal element, and X is a halogen element.

10. The method of claim 9, wherein A is Cs, Rb, K, Na, Li, or a combination thereof,
M is gadolinium (Gd), yttrium (Y), ytterbium (Yb), erbium (Er), europium (Eu), cerium (Ce), terbium (Tb), or a combination thereof, and
X is F, Cl, Br, I, or a combination thereof.

11. The method of claim 9, wherein $R^1COOH$ comprises one acid selected from a group consisting of oleic acid, stearic acid, myristic acid, lauric acid, palmitic acid, elaidic acid, eicosanoic acid, heneicosanoic acid, tricosanoic acid, docosanoic acid, tetracosanoic acid, hexacosanoic acid, heptacosanoic acid, octacosanoic acid, and cis-13-docosenoic acid.

12. The method of claim 9, wherein $R^2NH_2$ comprises one amine selected from a group consisting of octylamine, nonylamine, heptylamine, hexylamine, pentylamine, hexadecanamine, octadecylamine, dodecylamine, and oleylamine,
wherein $R^2R^3NH$ comprises one amine selected from a group consisting of dimethylamine, diethylamine, dipropylamine, and dioctylamine,
wherein $R^2R^3R^4N$ comprises trioctylamine.

13. The method of claim 9, wherein in the (a), $R^1COOH$: $R^2NH_2$, or $R^1COOH$: $R^2R^3NH$, or $R^1COOH$: $R^2R^3RAN$ are mixed with each other in a molar ratio of 1:0.5 to 2, and R¹COOH: the first non-polar solvent is mixed with each other in a molar ratio of 1:10 to 40.

14. The method of claim 9, wherein the (b) comprises producing the stirred solution by stirring the mixed solution in a vacuum state at 100 to 150° C. for 1 to 10 hours.

15. The method of claim 9, wherein the (c) comprises producing metal halide colloidal nanoparticles by reacting the stirred solution at 200 to 285° C. for 15 to 120 minutes under presence of an inert gas.

16. A light emitting device including the metal halide colloidal nanoparticles of claim 1.

* * * * *